United States Patent [19]
Beauchamp et al.

[11] Patent Number: 4,612,628
[45] Date of Patent: Sep. 16, 1986

[54] FLOATING-POINT UNIT CONSTRUCTED OF IDENTICAL MODULES

[75] Inventors: Robert W. Beauchamp, Milford, Mass.; George P. Springer, Houston, Tex.

[73] Assignee: Data General Corp., West Borough, Mass.

[21] Appl. No.: 465,955

[22] Filed: Feb. 14, 1983

[51] Int. Cl.[4] .......................... G06F 7/48; G06F 12/00
[52] U.S. Cl. ........................................ 364/748; 364/900
[58] Field of Search ... 364/748, 749, 745, 200 MS File, 364/900 MS File

[56] References Cited

U.S. PATENT DOCUMENTS

| | | | |
|---|---|---|---|
| 3,651,476 | 3/1972 | Metz et al. | 364/200 |
| 3,806,881 | 4/1974 | Miwa et al. | 364/200 |
| 4,161,784 | 7/1979 | Cushing et al. | 364/748 |
| 4,237,543 | 12/1980 | Nishio et al. | 364/900 |
| 4,241,415 | 12/1980 | Masaki et al. | 364/900 |
| 4,476,537 | 10/1984 | Blau et al. | 364/748 |

OTHER PUBLICATIONS

Rallapalli et al., "Chips Make Fast Math a Snap for Microprocessors" *Electronics*, vol. 53, No. 10, Apr. 24, 1980, pp. 153–57.

*Primary Examiner*—David H. Malzahn
*Attorney, Agent, or Firm*—Gerald Cechony; Joel Wall

[57] ABSTRACT

A floating-point unit constructed of at least two identical modules. Each module contains registers for storing floating-point data, a sign and exponent processing unit for processing the sign and exponent portions of floating-point values, and a mantissa processing unit for processing the mantissa portion. Buses allow transfer of operands from the registers to the mantissa and sign and exponent processing units and the return of the result to the registers. Interconnections between the modules and configuration logic on each module enable the modules to function as a single floating-point unit. The interconnections include connections between corresponding buses of the modules and connections between corresponding mantissa processing units. The configuration logic is responsive to position signals indicating the module's position relative to other modules in the floating-point unit and precision signals indicating the precision of the floating-point data being processed by the unit. The configuration logic enables the exponent processing unit of only the first module, and disables those of the remaining modules. The configuration logic further inhibits modules whose mantissa processing units are not required for processing a mantissa of a given precision from affecting the results produced by the remaining mantissa processor units. In modules other than the first module, the connections between corresponding buses transfer bits normally processed by the sign and exponent processor to and from the mantissa processor of an adjacent module.

32 Claims, 9 Drawing Figures

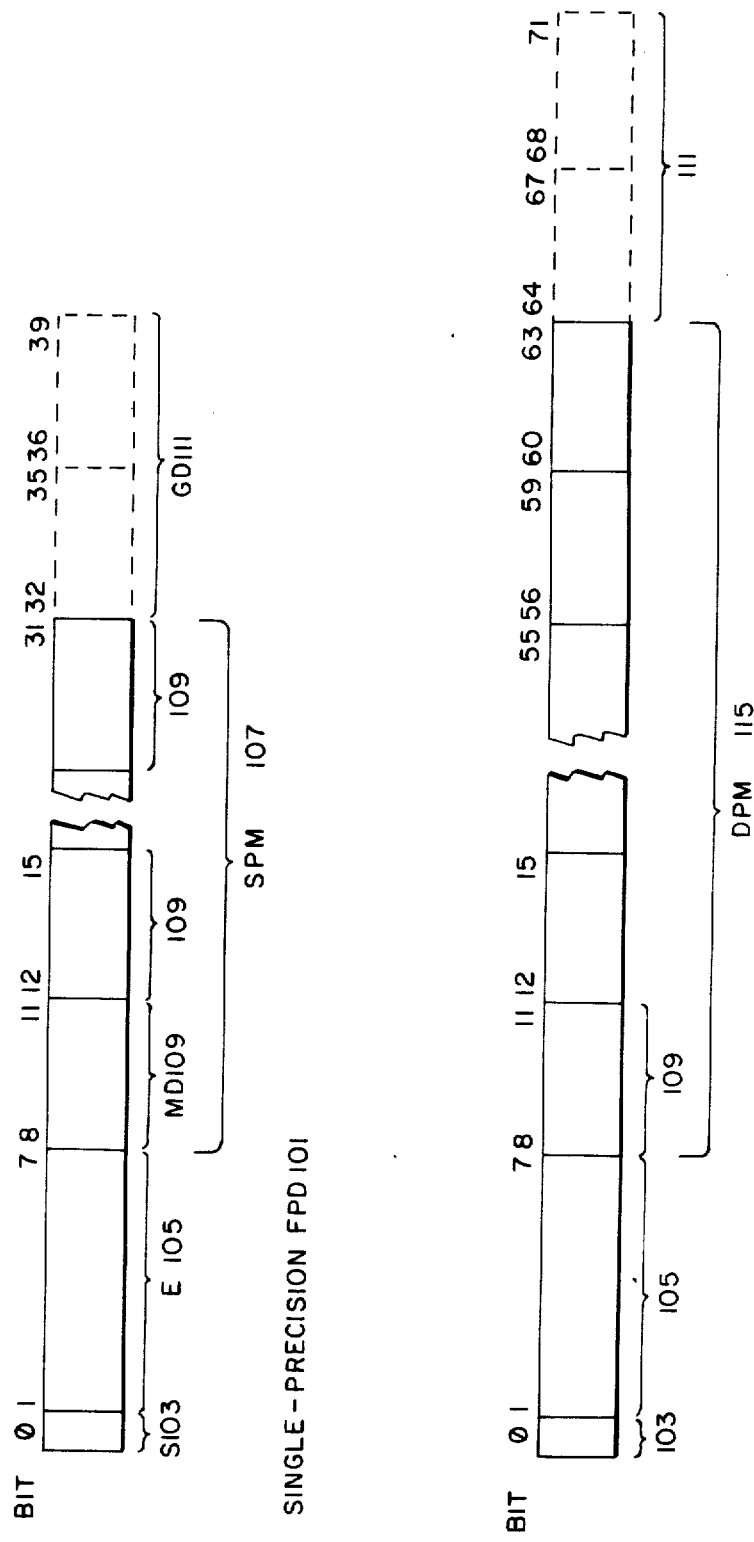
FIG. 1: FLOATING POINT DATA

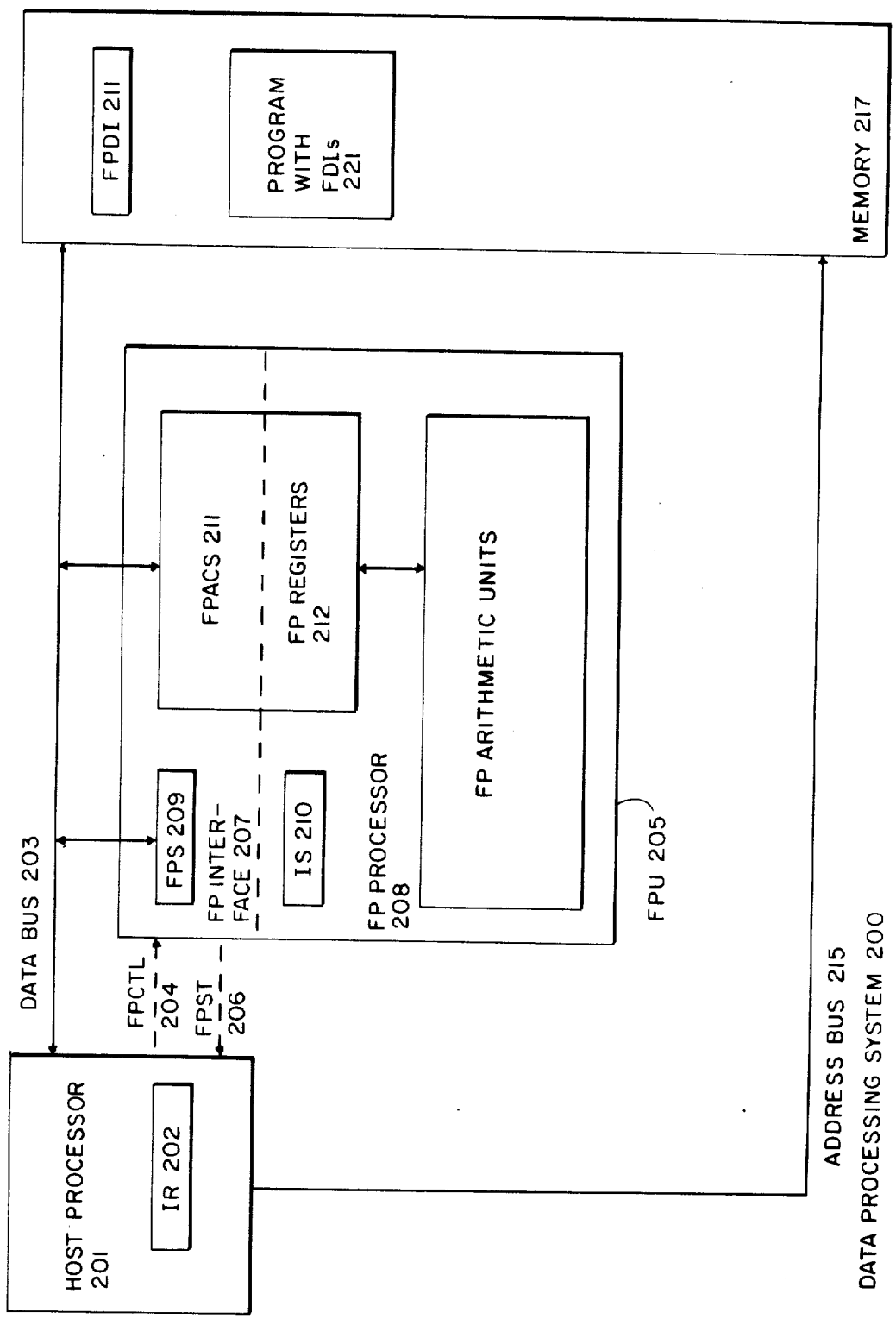
FIG. 2: FPU IN A DIGITAL DATA PROCESSING SYSTEM

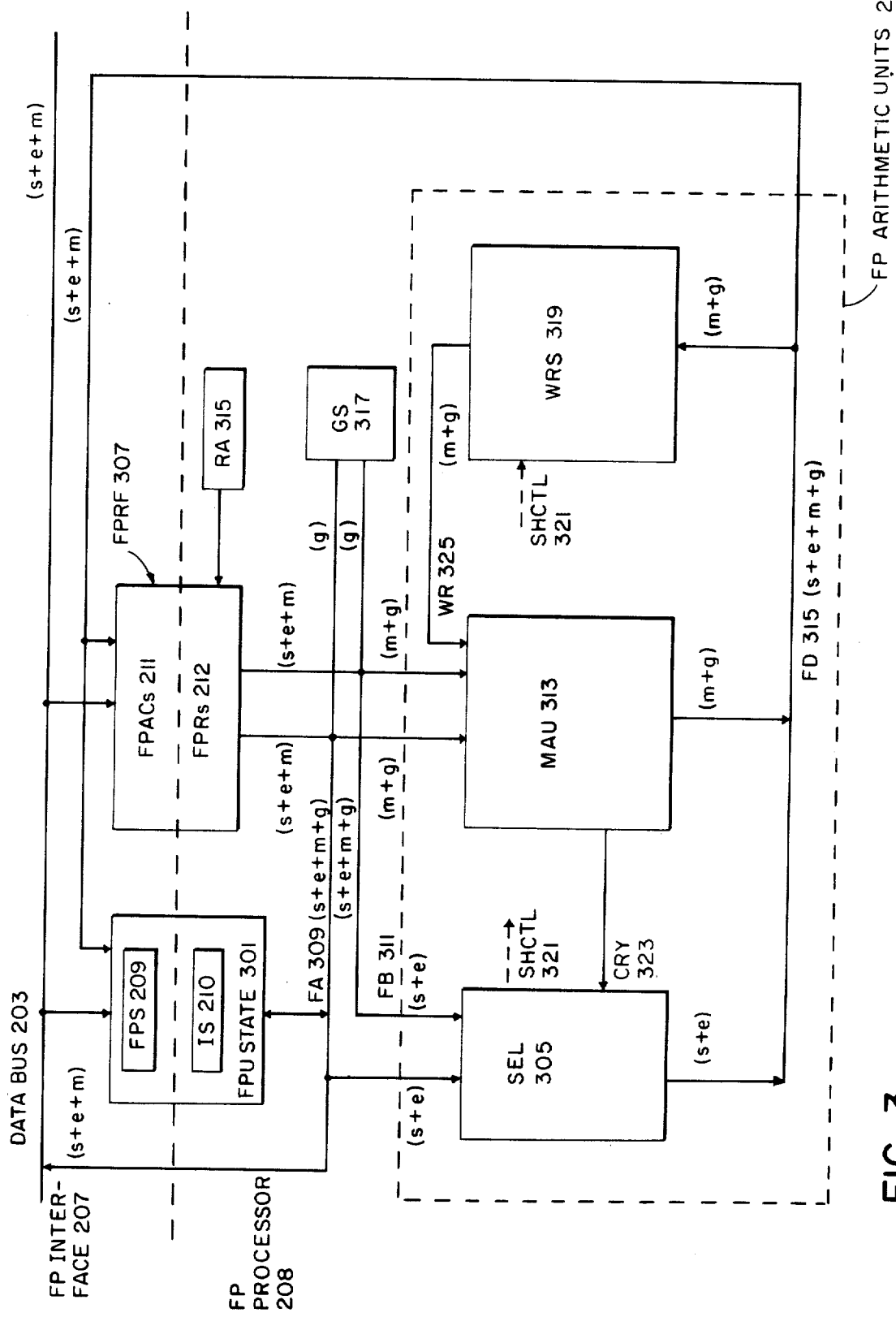
FIG. 3: GENERALIZED FPU 205

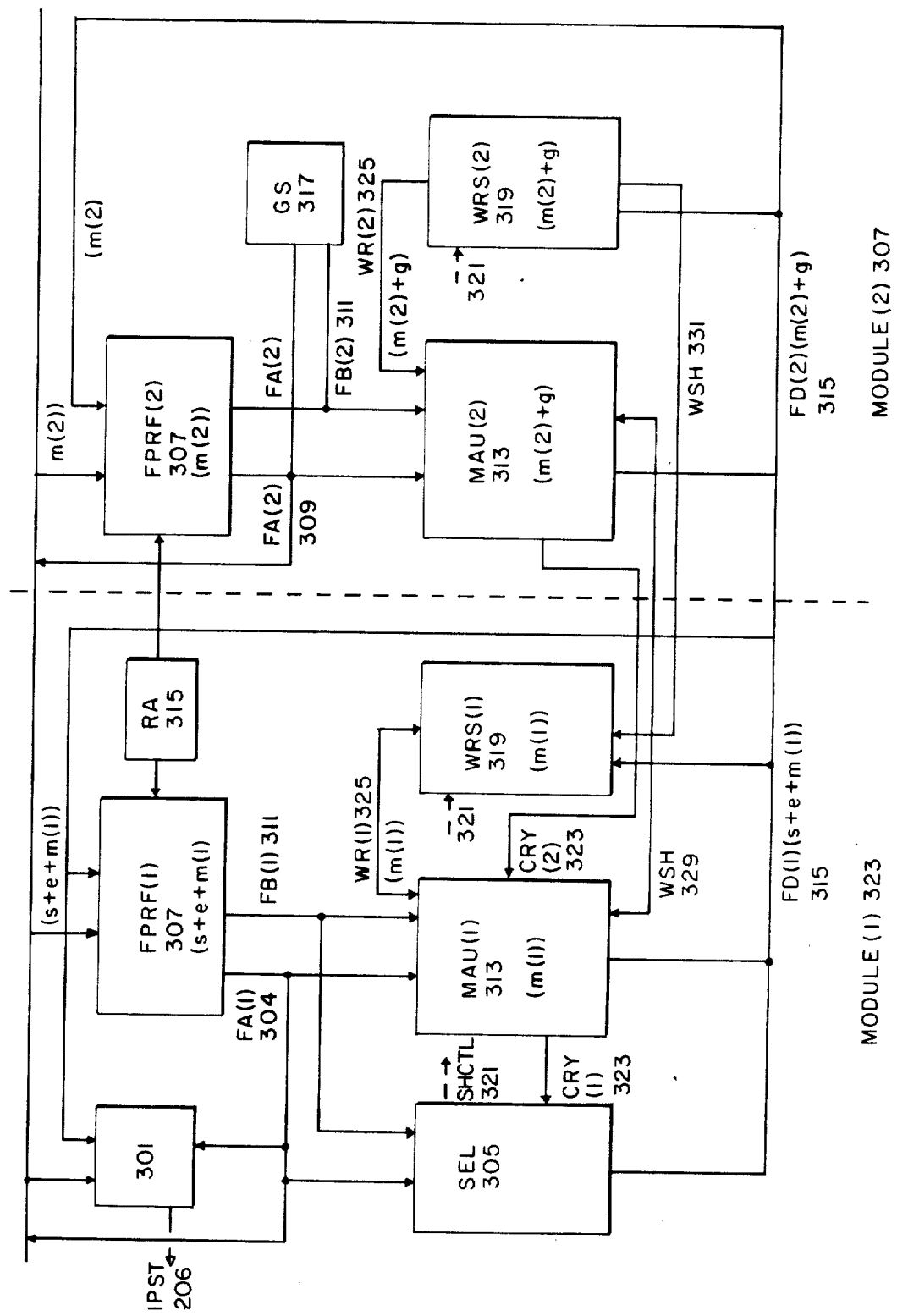
FIG. 3A: GENERALIZED DOUBLE PRECISION FPU 324

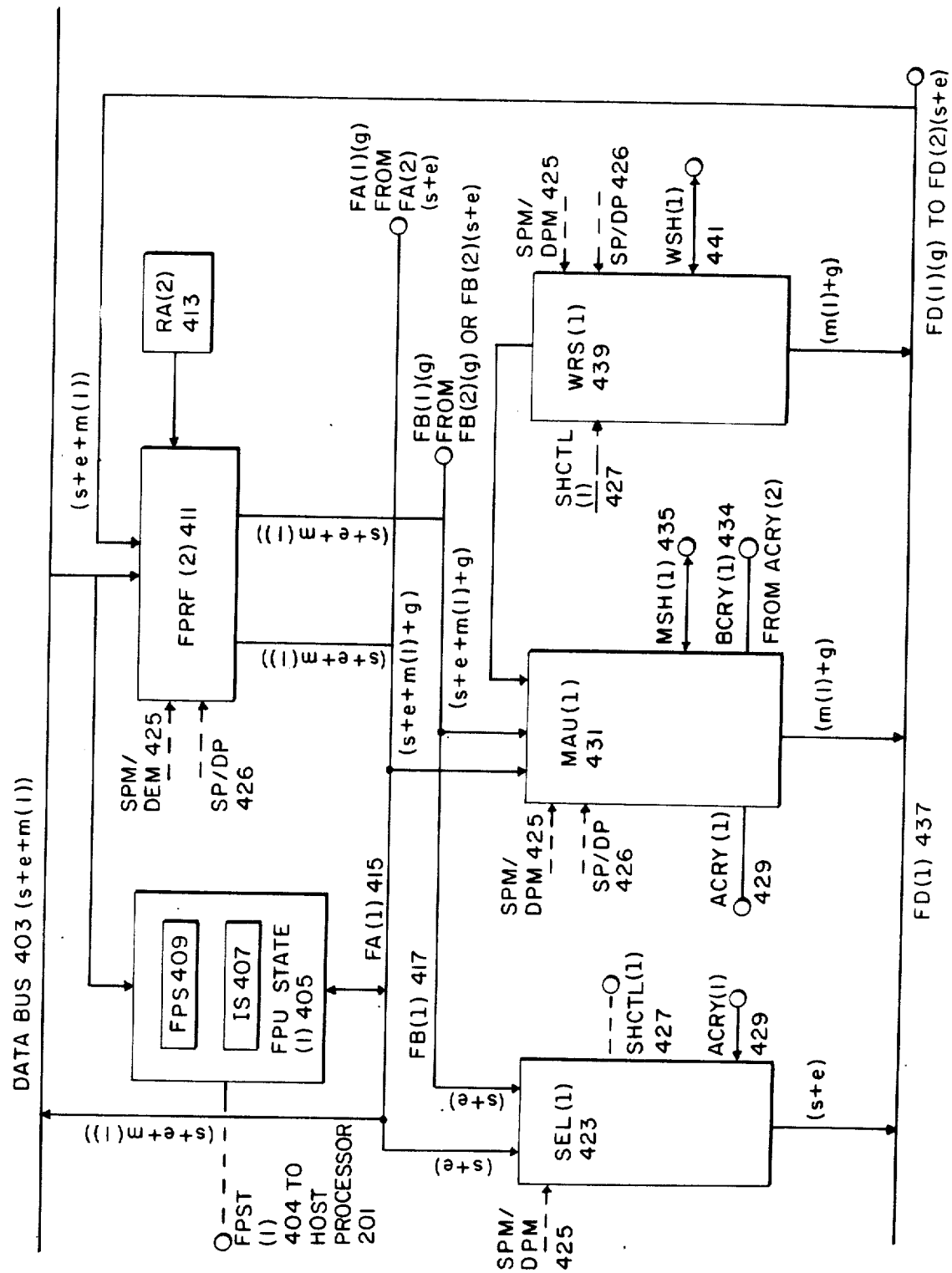
FIG. 4: MODULE (1) 401 OF IFPU 400

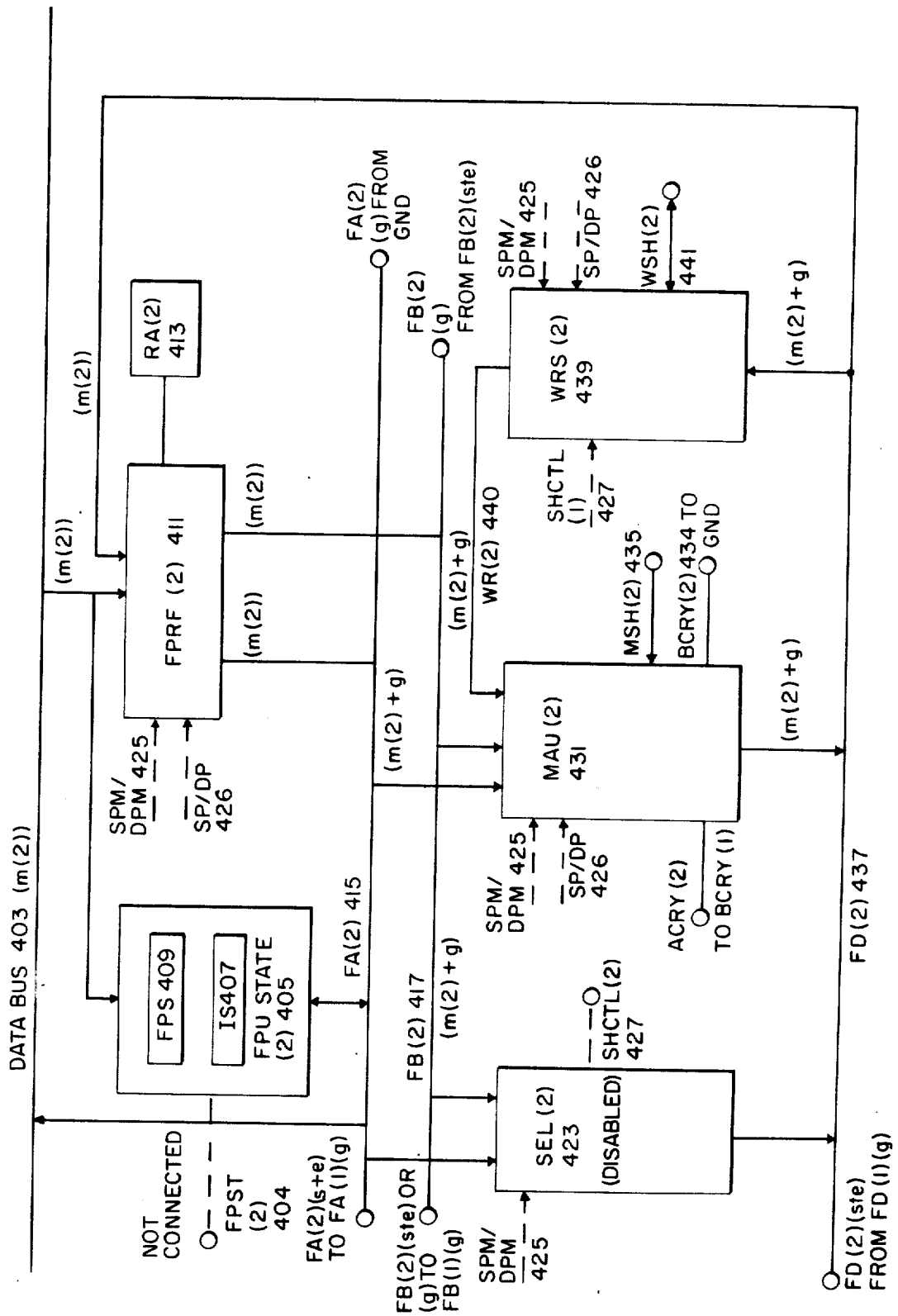
FIG. 4A: MODULE (2) 443 OF IFPU 400

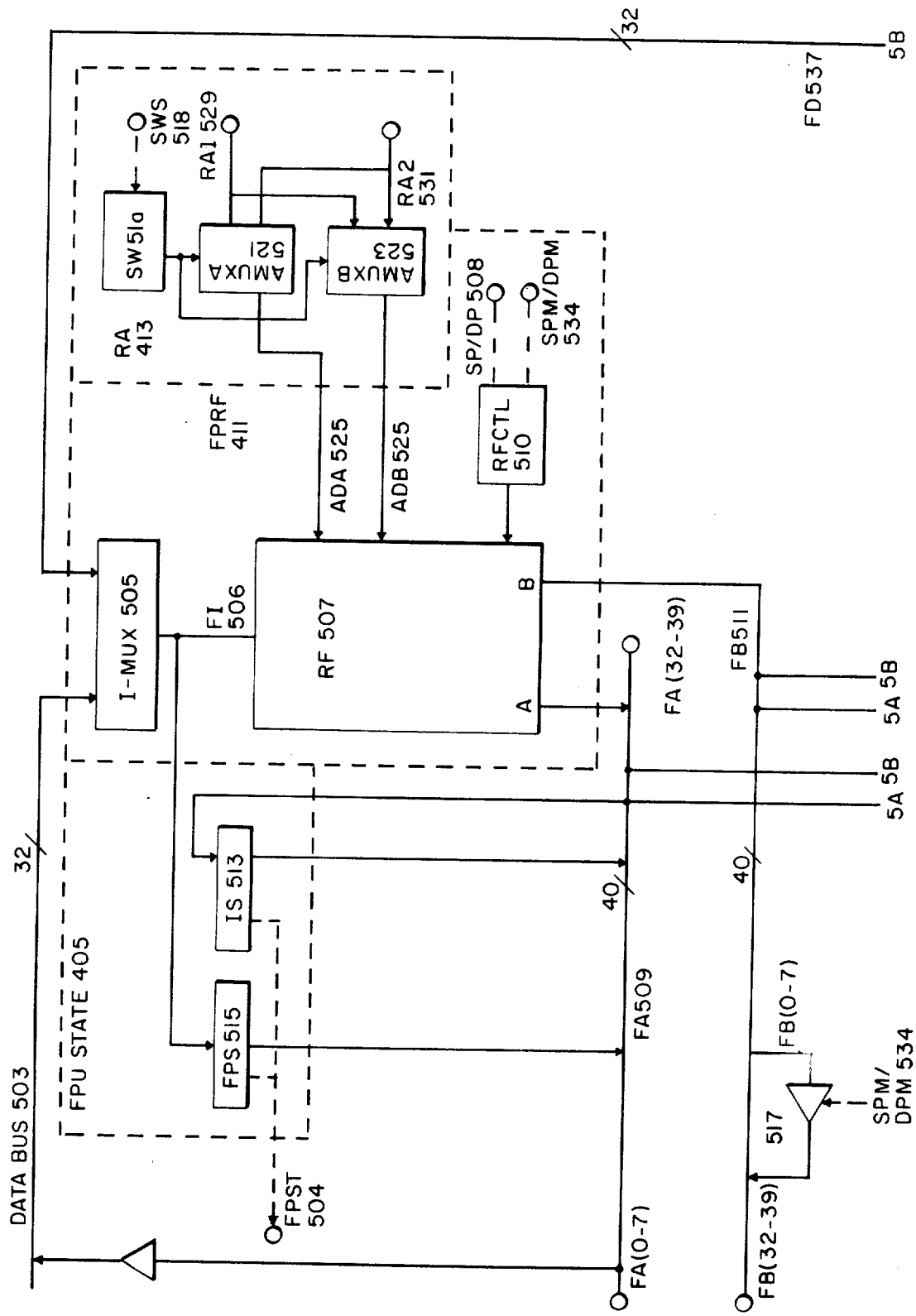
FIG. 5: PREFERRED EMBODIMENT OF A MODULE 501 OF IFPU400

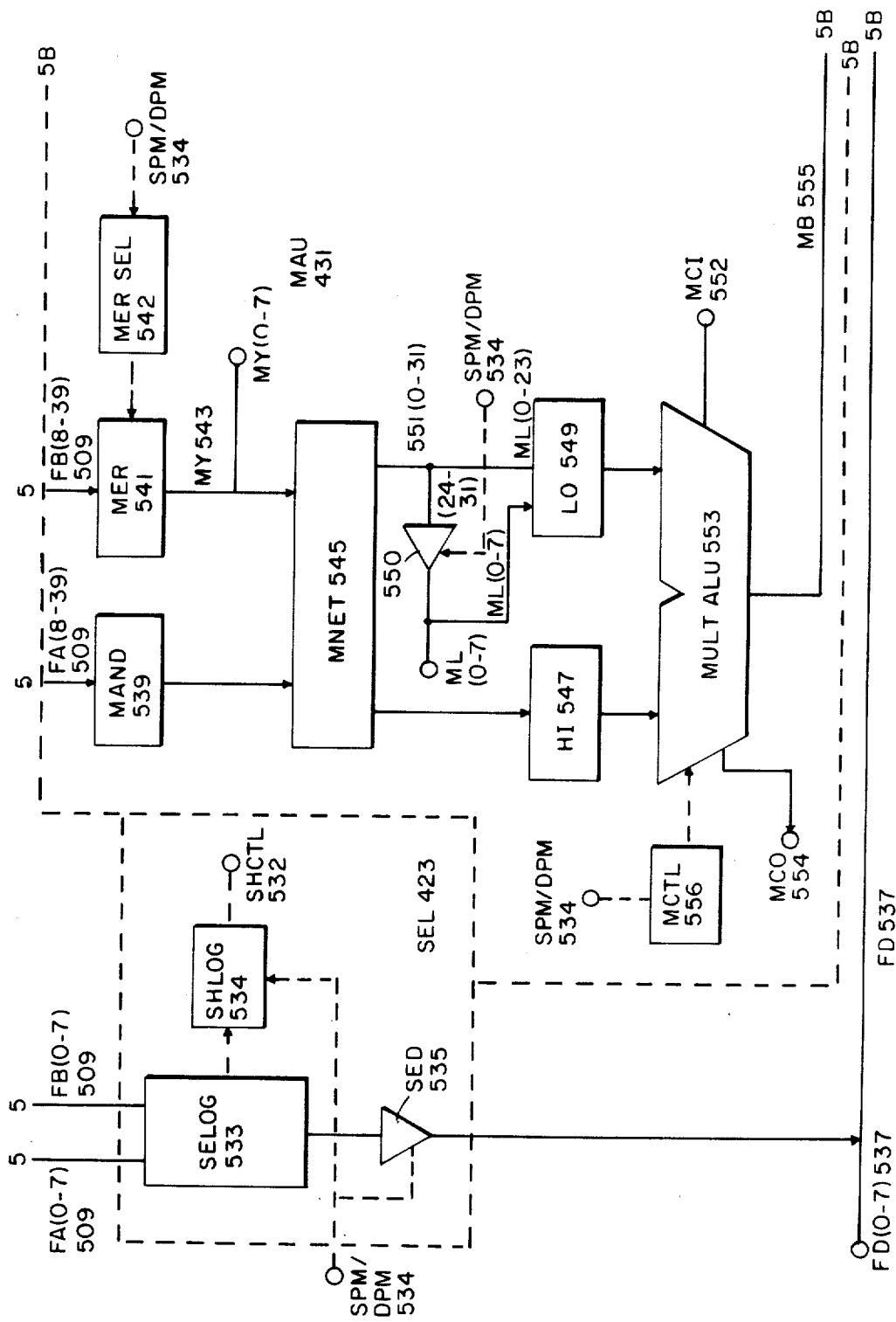
FIG. 5A: PREFERRED EMBODIMENT OF MODULE 501

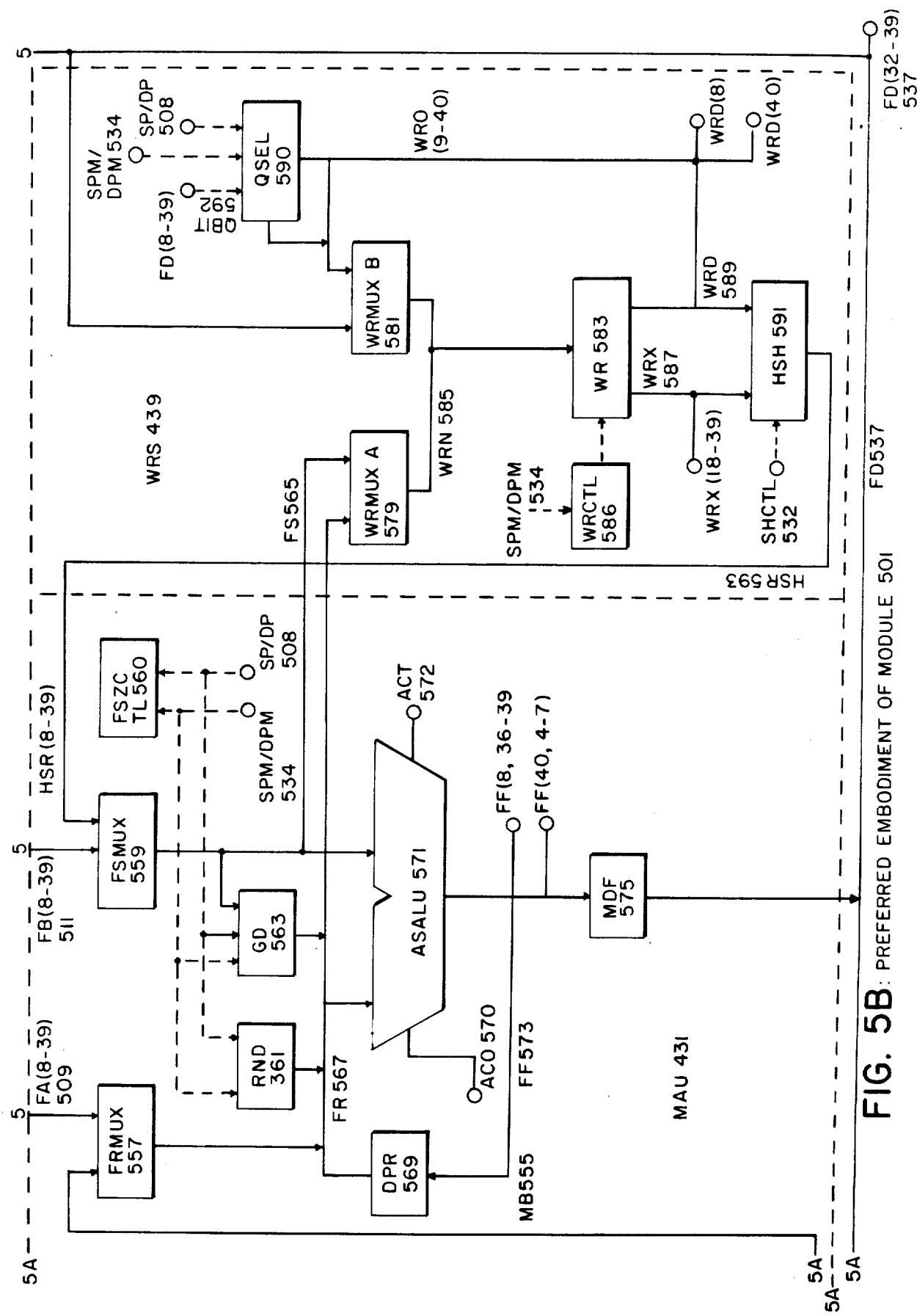
FIG. 5B: PREFERRED EMBODIMENT OF MODULE 501

FLOATING-POINT UNIT CONSTRUCTED OF IDENTICAL MODULES

ABSTRACT
BACKGROUND OF THE INVENTION
 1. Field of the Invention
 2. Description of Prior Art
SUMMARY OF THE INVENTION
BRIEF DESCRIPTION OF THE DRAWINGS
DESCRIPTION OF THE PREFERRED EMBODIMENTS
 1. Floating-Point Data—FIG. 1
 2. Introduction to Floating-point Units
  2.1 A Digital Data Processing System Employing an FPU—FIG. 2
  2.2 Overview of a Generalized FPU 205—FIG. 3
  2.3 A Double-Precision FPU 205—FIG. 3A
 3. The Improved FPU of the Present Invention—FIGS. 4 and 4A
  3.1 Components of Modules of IFPU 400
  3.2 Combination of Module (1) 401 and Module (2) 443 into IFPU 400
  3.3 Operation of IFPU 400
   3.3.1 Operation of IFPU 400 when Performing Single-Precision Operations
   3.3.2 Operation of IFPU 400 when Performing Double-Precision Arithmetic Operations
 4. Details of a Preferred Embodiment of IFPU 400—FIGS. 5-5B
  4.1 Embodiments of FPU State 405, and FPRF 411 in Module 501—FIG. 5
  4.2 Embodiment of RA 413 in Module 501—FIG. 5
  4.3 Embodiment of SEL 423 in Module 501—FIG. 5A
  4.4 Embodiment of MAU 431 in Module 501—FIGS. 5A and 5B
   4.4.1 The Multiplication Unit—FIG. 5A
   4.4.2 The Addition-Subtraction Unit—FIG. 5B
  4.5 Embodiment of WRS 439 in Module 501—FIG. 5B
 5. Operation of two Modules 501 as an IFPU 400
 6. Other Configurations of IFPU 400

BACKGROUND OF THE INVENTION

1. Field of the Invention

The invention relates generally to data-processing systems and more specifically to floating-point units utilized by such systems to perform arithmetic operations on floating-point data.

2. Description of Prior Art

In the prior art, floating-point units have been constructed for performing arithmetic operations on single-precision floating-point data, double-precision floating-point data, or either single-precision floating-point data or double-precision floating-point data. Such floating-point units contain registers for storing floating-point data being processed, logic for processing the sign and exponent parts of floating-point data, mantissa arithmetic units for processing the mantissa, and logic for providing status signals to the processor controlling the floating-point unit.

Floating-point units for operating only on single-precision floating point data have been constructed on a single module such as a printed circuit board; those for operating on double-precision floating-point data or both single- and double-precision floating-point data have been constructed using two modules, one containing registers for the sign, exponent, and part of the mantissa of the double-precision floating point data, the logic for processing the sign and exponent, a mantissa arithmetic unit for processing that portion of the mantissa stored on the module and the logic providing status signals to the processor controlling the floating-point unit. The other module in such floating-point units contains registers for storing the remaining part of the mantissa and a mantissa arithmetic unit.

The requirement that a double-precision floating-point unit be made up of two different modules has increased the complexity of digital data processing systems and has thereby increased the cost of manufacturing such systems, of servicing such systems, and of maintaining parts inventories for manufacture and repair. This problem of prior-art floating-point units and others as well are remedied by the present invention.

SUMMARY OF THE INVENTION

The present invention is a floating-point unit for processing either single-precision or double-precision floating-point data. The floating-point unit consists of at least two identical modules. Each module contains at least registers for storing floating-point data, sign and exponent logic, and a mantissa arithmetic unit. The modules are made to function as a single floating-point unit by means of signals indicating whether a module is the first module of the floating-point unit and whether a single-precision or a double-precision operation is being performed. The signal indicating whether a module is a first module disables the sign and exponent logic of all modules but the first, and thus only the first module processes sign and exponent bits. The signal indicating whether a single-precision or double-precision operation is performed causes modules not needed in processing a single-precision operation to output 0's as results when a single-precision operation is being performed. Means are provided for interconnecting buses in the modules. Some of the interconnections allow portions of the mantissa to be stored in registers in one module and processed in the mantissa arithmetic unit of another; others allow bits to be passed between the mantissa arithmetic units of the modules. Thus, the modules work together as a single unit to process floating-point data.

It is thus an object of the present invention to provide an improved digital data processing system.

It is a further object of the invention to provide a floating-point unit having properties which reduce manufacturing, repair, and inventory costs.

It is another object of the invention to provide a floating-point unit constructed of identical modules.

It is an additional object of the invention to provide a floating-point unit constructed of identical modules which configure themselves as required for their positions in the floating-point unit and the precision of the data being processed.

It is a still further object of the invention to provide a floating-point unit constructed of identical modules which can process floating-point data of different precisions.

It is yet another object of the invention to provide individual modules having a sign and exponent processor which may be disabled.

It is a still further object of the invention to provide individual modules having mantissa processors which do not affect the results of a calculation for which they are not needed.

Other objects, advantages, and features of the present invention will be understood by those of ordinary skill in the art after referring to the following detailed description of the preferred embodiment and drawings, wherein:

BRIEF DESCRIPTION OF THE DRAWINGS

FIG. 1 depicts single-precision and double-precision point data of the type processed by the present invention.

FIG. 2 shows the relationship between a floating-point unit and the other components of a digital data processing system.

FIG. 3 is a generalized depiction of a floating-point unit.

FIG. 3A is a depiction of a floating-point unit for processing double-precision floating-point data consisting of two modules.

FIGS. 4 and 4A are a depiction of two modules of a floating-point unit of the present invention and the interconnections between them.

FIGS. 5, 5A, and 5B are a depiction of a preferred embodiment of a module of a floating-point unit of the present invention.

Reference numbers in the following description have 3 digits; the leftmost digit is the number of the Figure in which the item identified by the reference numbers first appears.

DESCRIPTION OF THE PREFERRED EMBODIMENTS

The Description of the Preferred Embodiments begins with a discussion of single- and double-precision Floating Point Data (FPD), then shows how a Floating-point Unit (FPU) for processing floating point data may be included in a host central processing unit (CPU), continues with a high-level discussion of FPUs in general and the Improved FPU (IFPU) of the present invention in particular, and finishes with a discussion of a Preferred Embodiment of the present invention.

1. Floating-Point Data—FIG. 1

Floating-point data is data which represents real numbers by means of a sign value, an exponent value, and a fractional mantissa value. Examples of such representations are commonly seen in scientific notation: the value 138, for example, is expressed in scientific notation as follows:

$$+1.38 \; E2$$

where + is the sign, 1.38 the mantissa, and E2 the exponent. In this case, the floating-point value is a base-10 value. 1.38 is a decimal fraction, and E2 represents 10 raised to the second power. The value 138 is obtained by multiplying 1.38 by 10**2 or 100.

In digital data processing systems, FPD is represented by means of a sequence of bits. As in the example above, the sequence specifies a sign, an exponent, and a mantissa. One such representation of FPD is shown in FIG. 1. In the representation of FIG. 1, the exponent specifies a power of 16 and the mantissa is a fractional hexadecimal value. Beginning with Single-Precision FPD 101, it may be seen that the representation of Single-Precision FPD requires 32 bits. Bit 0 (S 103) is the sign bit. It specifies the sign of the floating-point value. Bits 1 through 7 (E 105) specify a positive or negative power of 16. Bits 8 through 31 (SPM 07) specify the mantissa as a sequence of 6 hexadecimal digits. Each Mantissa Digit (MD) 109 contains 4 bits, which represent a value ranging from 0 through 15. Zero is represented by setting all bits in Single-precision FPD 101 to 0.

The mantissa is commonly normalized, that is, the value of the exponent is increased or decreased until the hexadecimal point is immediately to the left of the most significant MD 109, and the most significant MD 109 is not 0. Normalization is carried out by shifting the MDs 109 to the left or right as required. Each time the mantissa is shifted one MD 109 to the left, E 105 is decremented by 1; each time it is shifted one MD 109 to the right, E 105 is incremented by 1. During calculations, the least-significant MD 109 is often followed by one or more Guard Digits (GD) 111 In Single-Precision FPD 101, there are two GDs 111. If an arithmetic operation such as multiplication produces digits of less significance than the least-significant MD 109, the two most-significant of these digits are maintained in GD 111 until the result of the calculation is rounded. The rounding operation then rounds up or down depending on the value of GDs 111.

Double-precision FPD 113 differs from Single-precision FPD 101 in only one respect: the mantissa, DPM 116, contains 14 MDs 109, instead of 6 MDs 109, and therefore represents 14 instead of 6 hexadecimal digits. Like Single-precision FPD 101, Double precision FPD 113 contains S 103 specifying a sign and E 105 specifying a positive or negative power of 16. Double-precision FPD 113 is further normalized like Single-precision FPD 101, and the two GDs 111 have the same function. Zero is similarly represented by setting all bits in Double-precision FPD 113 to 0.

2. Introduction to Floating-point Units

FPD represented as described above may be stored in the memory of a digital data processing system; calculations using the data are then performed by the digital data processing system's processor in response to instructions contained in a program. The instructions may be general-purpose instructions, but the instruction sets for many processors include special floating-point instructions (FPIs) for use with FPD. If such a processor does not have an FPU, it executes the FPIs using its general-purpose registers and ALUS; if it does have an FPU, it uses the FPU to execute the FPIs.

2.1 A Digital Data Processing System Employing an FPU—FIG. 2

FIG. 2 is a block diagram of a data processing system which has FPIs and uses a FPU 205 to execute them. Data Processing System 200 includes Host Processor 201, FPU 205, and Memory 217. Memory 217 contains at least a Floating-Point Data Item (FPDI) 219 containing FPD and a Program 221 containing FPIs. Data Bus 203 transfers instructions from Memory 217 to Host Processor 201 and data between Memory 217, Floating Point Unit 205, and Host Processor 201. Memory 217 provides and receives data on Data Bus 203 in response to addresses and memory control signals received from Host Processor 201 via Address Bus 215.

Host Processor 201 controls its own components, FPU 205, and Memory 217 in response to instructions received from Memory 217 via Data Bus 203. The instruction currently being executed by Host Processor 201 is contained in IR 202. Host Processor 201 responds to the instruction in IR 202 by producing signals which actually control the components of Host Processor 201, FPU 205, and Memory 207. The components themselves in turn produce signals in the indicating their status, and Host Processor 201 responds to these signals as it executes instructions. In FIG. 2, the signals produced by Host Processor 201 to control FPU 205 are represented by FPCTL 204 and those indicating the status of FPU 205 are represented by FPST 207.

Typically, Host Processor 201 responds to the instruction currently being executed by executing a sequence of microinstructions associated with the instruction. The execution of the microinstructions then produces the signals which actually control the components of Host Processor 201, Memory 217, and FPU 205. However, in some Host Processors 201, the instruction in IR 202 itself directly controls Host Processor 201, FPU 205, and Memory 207. In others, FPU 205 or Memory 207 may itself be able to execute sequences of microinstructions which control only devices in FPU 205 or Memory 207 and may respond to a signal from Host Processor 201 by executing a sequence of those microinstructions.

Floating Point Unit 205 contains two main subparts: FP Processor 208, which actually performs calculations on FPD, and FPU Interface 207. FPU Interface 207 includes FP Accumulators 211 and FP Status Register (FPS) 209. FP Accumulators (FPACs) 211 are registers which may be specified as sources of or destinations for FPD in FPIs. FPS 209 contains a part of the status information used by FPU 205 to produce FPST 206. The status information in FPS 205 includes those parts of FPU 205's status to which FPIs may respond. For example, a Host Processor 201's FPIs may include an instruction which specifies a branch if the result of the operation performed by FPU 205 is 0. In such a case, FPS 209 contains a bit which is set when the result of the operation is 0, and if this bit is set, the resulting signal in FPST 206 causes the FPI to perform the specified branch.

Both FPACs 211 and FPS 209 are connected to Data Bus 203. FPACs 211 receives FPD from Data Bus 203 and provides FPD to Data Bus 203. The contents of FPS 209 may be stored in Memory 217 and loaded from Memory 217, thus allowing the status of FPU 205 to be saved and restored.

FP Processor 208 contains three components: FP Registers 212, FP Arithmetic Units 213, and Internal State (IS) 210. FP Registers 212 are connected to Data Bus 203 in the same manner as FPACs 211, and like FPACs 211, may receive FPD from Data Bus 203 and provide it to Data Bus 203. FP Registers 212 may not be specified in FPIs like FPACs 211, but Host Processor 201 may use them to perform operations specified in FPIs. Like FPS 209, IS 210 contains status information about FPU 205 which produces signals in FPST 206, but the status information in IS 210 is used only by microcode in Host Processor 201 and may not be used by programmers to control execution of FPIs. FP Arithmetic Units 213 are connected to FP Registers 212 and FP Accumulators 211, and may process FPD contained in either FP Registers 212 or FP Accumulators 211

The manner in which the components of Data Processing System 200 might interact in a floating-point calculation may be seen from a sketch of the manner in which Data Processing System 200 might execute a FPI specifying that a FPD contained in one of FPACs 211 be divided by the value of an FPDI 219 from Memory 217 and that the results be placed in FPAC 211 containing the dividend. The FPI specifies the operation, the address of FPDI 219, and FPAC 211 containing the dividend. When Host Processor 201 receives the FPI in IR 202, Host Processor 201 first calculates the address of FPDI 219 in Memory 217. It then provides an address and memory control signals to Memory 217 via Address Bus 215, and Memory 217 outputs FPDI 219 on Data Bus 203. Under control of Host Processor 201, FPU 205 receives FPDI 219 into an FP Register 212. FP Arithmetic Units 213 then performs the division under control of Host Processor 201 and places the result in the FPAC 211 which contained the dividend at the beginning of the operation.

If a condition such as division by 0 occurs which may require intervention by Host Processor 201, FPS 209 signals the condition to Host Processor 201. An FPI executed by Host Processor 201 may then respond to the condition. Other FPIs allow an FPAC 211 to be loaded with FPDI 219 from a location in Memory 217 and allow the contents of an FPAC 211 to be stored at a location in Memory 217, and thus FPDI 219 may be fetched from memory, used to calculate an FPD value, and the value stored in a location in Memory 217.

2.2 Overview of a Generalized FPU 205—FIG. 3

FIG. 3 presents a block diagram of the general internal structure of a FPU 205. Dashed lines divide FIG. 3 into FP Interface 207, FP Processor 208, and FP Arithmetic Units 213 as described in FIG. 2.

FPU 205 has the following components:

(1) FPU State 301, which contains FPS 209 and IS 210 and produces FPST 206.

(2) FP Register File (FPRF) 307, which contains registers for storing FPD. These registers include FPACs 211 and FPRs 212.

(3) Register Addressing Logic (RA) 315, which simultaneously addresses two registers in FPRF 307 as sources of FPD to be processed by FPU 205 and of these registers as a destination for the results. The addresses themselves may be provided by Host Processor 201 microcode.

(4) Sign and Exponent Logic (SEL) 305, which processes S 103 and E 105 of FPD.

(5) Mantissa Arithmetic Unit (MAU) 313, which performs arithmetic operations on SPM 107 or DPM 115 of FPD.

(6) WRS 319, which stores intermediate results from MAU 313 and performs shift operations.

(7) Guard Source (GS) 317, which provides GDs 111 before calculations are performed on FPD.

FPD and state data is tranferred to and from FPU 205 by Data Bus 203; FPD is transferred within FPU 205 by FA Bus 309, FB Bus 311, FD Bus 315, and WR Bus 325. The portions of a given FPD value carried by each bus are indicated by the letters s, e, m, and g. s stands for S 103, e for E 105, m for SPM 107 or DPM 115, and g for GD 111. A plus sign between the letters indicates that a bus is carrying both portions of the FPD value. Thus, FA 309 carries (s+e+m+g), or an entire FPD plus GD 111. FA 309 provides (s+e) to SEL 305 and (m+g) to MAU 313 and receives (g) from GS 317. In the following, s, e, m, and g may appear in parentheses following a bus name to specify which portion of the FPD carried by the bus is meant. For example, (g) carried by FA 309 is specified by FA(g) 309. The internal buses may be described in detail as follows:

(1) FA Bus 309 receives (s+e+m) from one of the addressed registers of FPRF 307 and GDs 111 from GS 317. It provides (s+e+m) to Data Bus 203, (s+e) to SEL 305, and (m+g) to MAU 313. It also provides state data to and receives state data from FPU State 301.

(2) FB Bus 311 receives (s+e+m) from another of the addressed registers of FPRF 307 and GDs 111 from GS 317. It provides (s+e) to SEL 305 and (m+g) to MAU 313.

(3) FD Bus 311 receives the result of an operation performed by SEL 305 and MAU 313. FD Bus 311 receives (s+e) from SEL 305 and (m+g) from MAU 313. It provides (m+g) to WRS 319 and (s+e+m) to one of the addressed registers of FPRF 307.

(4) WR Bus 325 receives (m+g) of an intermediate result from WRS 319 and provides it to MAU 313.

In addition, SEL 305 receives a carry bit from MAU 313 via CRY 323 and provides a Shift Control signal (SHCTL) 321 to WRS 319.

FPU 205 operates as follows: RA 315 simultaneously provides two addresses to FPRF 307. One address is that of an A register which provides provides (s+e+m) to FA 309, and the other that of a B register which provides (s+e+m) to FB 311. When the operation performed by FPU 205 is complete, the B register contains the result.

GS 317 provides (g) to both FA 309 and FB 311. FA(s+e) 309 and FB(s+e) 311 are simultaneously received by SEL 305 and FA(m+g) 309 and FB(m+g) 311 are simultaneously received by MAU 313. SEL 305 then processes FA(s+e) 309 and FB(s+e) 311 as required by the operation being performed. The result appears as FD(s+e) 315. If a shift operation is required to normalize FPD, SEL 305 generates a SHCTL signal 321.

MAU 313 simultaneously receives FA(m+g) 309 and FB(m+g) 309 as inputs. The result of the operation performed on them appears as FD(m+g) 315. If the operation results in a bit being carried out of MAU 313, that bit is provided via CRY 323 to SEL 305, which responds to the CRY bit by incrementing E 105 of the result FPD. Incremented E 105 appears as FD(e) 315. If the operation performed by MAU 313 requires several steps, intermediate results pass via FD(m+g) 315 to WRS 319. WRS 319 responds to SHCTL 321 produced by SEL 305 and shifts the intermediate results as required. The intermediate result may then be provided via WR(m+g) 325 as a new input to MAU 313. While processing the intermediate result, MAU 313 may provide further carry bits to SEL 305 on CRY 323. MAU 313 and WRS 319 thus cooperate to process the mantissas of the FPD and may be regarded as a mantissa processing unit.

On completion of the operation, FD(s+e+m) 315 is stored in the specified B register of FPRF 307. If the result is to be provided to Memory 217 or Host Processor 201, a separate operation specifies the B register as the A register and the result passes via FA 309 to Data Bus 203.

2.3 A Double-Precision FPU 205—FIG. 3A

Generalized FPU 205 of FIG. 3 may be constructed as either a single-precision or a double-precision FPU, depending on the width of components FRF 307, MAU 313, and WRS 319 and of buses FA 309, FB 311, FD 315, and WR 325. For example, in a FPU 205 for performing computations on Single-precision FPD 101, FPRF is 32 bits wide and MAU 313, WRS 319, FA 309, FB 311, and WR 325 are 40 bits wide. In one for performing computations on Double-precision FPD 113, FPRF is 64 bits wide and MAU 313, WRS 319, and the buses are 72 bits wide.

Typically, a single-precision FPU 205 is constructed in one module, while a double-precision FPU 205 is constructed in two modules. The modules may be separate printed circuit boards, separate integrated circuits, or simply distinct circuit modules. FIG. 3A shows a Double-precision FPU (DFPU) 324 constructed in two modules. Module 1 323 includes FPU State 301, SEL 305, and RA 315. It further includes FPRF(1) 307, MAU(1) 313, and WRS(1) 319, as well as the buses FA(1) 319, FB(1) 311, FD(1) 315, and WR(1) 325. The registers of FPRF(1) contain S 103, E 105, and a first portion of DPM 115, represented here by m(1). FA(1) 309, FB(1) 311, and FD(1) 315 all carry (s+e+m(1)), while WR(1) 325 carries (m(1)).

Module 2 327 includes FPRF(2) 307, MAU(2) 313, WRS(2) 319, and GS 317. The buses are FA(2) 309, FB(2) 311, FD(2) 315, and WR(2) 325. FPRF(2) 307 receives addresses from RA 315 simultaneously with FPRF(1) 307, and consequently, FPD is simultaneously read from or stored to corresponding registers in FPRF(1) 307 and FPRF(2) 307. As described above, a register in FPRF(1) 307 contains (s+e+m(1)); the corresponding register in FPRF(2) 307 contains (m(2)); both together consequently contain the entire double precision FPD. FA(2) 309 and FB(2) 311 each carry (m(2)) and guard digits received from GS 317; FD(2) 315 and WR(2) 319 also carry (m(2)+g). MAU(2) 313 and WRS(2) 319 perform operations on (m(2)+g).

DFPU 324 functions as a single FPU for the following reasons:

* FPRF(1) 307 and FPRF(2) simultaneously receive the same addresses from RA 315 and consequently output entire double-precision FPD values.

* MAU(1) 313 and MAU(2) 313 are connected by MAU Shift Bus (MSH) 329 and CRY(2) 323. Operations such as division or multiplication performed by MAU 313 may require shift operations; MSH 329 allows bits to be shifted back and forth between MAU(1) 313 and MAU(2) 313 during such operations. Similarly, addition operations may produce carry bits; CRY(2) allows a carry signal produced by the most-significant MD 109 in MAU(2) to be provided to the least-significant MD in MAU(1) 313. MSH 329 and CRY(2) 323 thus effectively make MAU(1) 313 and MAU(2) 313 into a single logical MAU 313 for processing DPMs 115.

* SHCTL 321 and WSH 331 make WRS(1) 319 and WRS(2) 319 into a single logical WRS 319 for processing DPMs 115. Since both WRS(1) 319 and WRS(2) 319 respond to SHCTL 321, both shift at the same time; WSH 331 allows shifted bits to pass from WRS(1) 319 to WRS(2) 319 or vice-versa, as required by the operation being performed.

DPFPU 324 performs double-precision operations as follows: Data Bus 203 can typically carry fewer bits than required for a single Double-precision FPD 113, so loading FPRF(1) and FPRF(2) requires two operations. In one of the operations, a specified register in FPRF(1) 307 is loaded with (s+e+m(1)), and in the other, the corresponding register in FPRF(2) is located with (m(2)). When a double-precision calculation is performed, RA 315 provides the same addresses to FPRF(1) 307 and FPRF(2) 307, and consequently, (s+e+m(1)) from the selected A register of FPRF(1) appears on FA(1) 309, while (m(2)+g) from the corresponding register of FPRF(2) and GD 111 appears on FA(2) 309. Similarly, (s+e+m(1)) from the selected B register of FPRF(1) 307 appears on FB(1) 311, while (m(2)+g) from the corresponding register of FPRF(2) 307 and GD 111 appear on FB(2) 311. FA(1)(s+e) 309 and FB(1)(s+e) 311 are processed by SEL 305 in the manner described in the discussion of FPU 205; FA(1)(m(1)) 309 and FB(1)(m(1)) 311 are processed by MAU(1) 313 and WRS(1) 319, while FA(2)(m(2)+g) 309 and FB(2)(m(2)+g) 311 are processed by MAU(2) 313 and WRS(2) 319. When required by the operation, carry signals are transferred from MAU(2) 313 to MAU(1) 313 via CRY(2) 323 and data bits are transferred from MAU(2) 313 to MAU(1) 313 or vice-versa by MSH 329 or from WRS(1) 319 to WRS(2) 319 or vice-versa by WSH 331. During the operation, FD(1) 315 carries (s+e+m(1)), WR(1) 325 carries (m(1)), and FD(2) 315 and WR(2) 325 both carry (m(2)+g).

On conclusion of the operation, FD(1)(s+e+m(1)) 325 is stored in the B register of FPRF(1) and FD(2)(m(2)) 325 is stored in the corresponding register of FPRF(2). If Double-precision FPD 113 is to be provided to Host Processor 201 or Memory 217 and Data Bus 203 is not wide enough, Double-precision FPD 113 is placed on Data Bus 203 in two operations. In one, (s+e+m(1)) is transferred via FA(1) 309 from FPRF(1) to Data Bus 203; in the other, (m(2)) is transferred via FA(2) 309 from FPRF(2) 307 to Data Bus 203.

DPFPU 324 is also able to perform operations on Single-precision FPD 101. In this situation, Module 1 323 processes (s+e+m) for Single-precision FPD 101, while Module 2 325 processes (m(2)) consisting entirely of zeros. In this mode of operation, Module 2 325's (m(2)) essentially functions as GDs 111 for the Single-precision FPDs 101 being processed in Module 1. The zeros may be provided by loading registers in FPRF(2) 307 corresponding to the ones being loaded with Single-precision FPDs 101 with 0's, as well as by other means.

3. The Improved FPU of the Present Invention—FIGS. 4 and 4A

In the present invention, an Improved Floating Point Unit (IFPU) capable of performing either single- or double-precision floating-point operations is constructed of two identical modules. As was the case with the double-precision FPU described above, the modules may be separate printed circuit boards, separate integrated circuits, or simply distinct circuit modules. FIGS. 4 and 4A are generalized block diagrams of the IFPU. In these Figures, functional units corresponding to those of the FPUs of FIGS. 2 and 3 have the same names as the corresponding functional units of FIGS. 2 and 3, but different reference numbers, thereby allowing them to be distinguished from their functionally-similar counterparts. The notation used in FIGS. 2 and 3 to indicate which portions of FPD are carried by a bus is continued in FIGS. 4 and 4A. The designations (1) and (2) following a component name in FIGS. 4 and 4A indicate whether the designated component is on the first or second module of the IFPU. A circle at the end of a bus, finally, indicates that there is a connection at that point between a bus of the first module and a bus of the second module. The following discussion first describes the components of a module of IFPU 400, then the interconnection of the modules, and finally their operation when performing single- and double-precision arithmetic operations.

3.1 Components of Modules of IFPU 400

FIG. 4 shows module (1) 401 of IFPU 400. Both it and module (2) 443 (FIG. 4A) contain the following components:

(1) FPU State 405, which contains state of IFPU 400 in FPS 409 and IS 407 and produces FPST 404. FPS 409 contains state used by FPIs, while IS 407 contains internal state. Certain signals in FPST 404 may be responded to both by Host Processor 201 and components of IFPU 400.

(2) FPRF 411 contains registers for storing FPD.

(3) RA 413 simultaneously addresses two registers in FPRF 411.

(4) SEL 423 processes S 103 and E 105 of FPD.

(5) MAU 431 performs arithmetic operations on SPM 107 or DPM 115 of FPD.

(6) WRS 439 stores intermediate results from MAU 431 and performs shift operations.

These components are connected by the following buses:

(1) Data Bus 403 is connected to FPRF 411 and transfers FPD and state data to and from FPRF 411 and FPU State 405 respectively.

(2) FA 415 receives FPD from one of the registers in FPRF 411 addressed by RA 413 and provides it to Data Bus 403 or to SEL 423 and MAU 431.

(3) FB 417 receives FPD from another of the registers in FPRF 411 addressed by RA 413 and provides it to SEL 423 and MAU 431.

(4) FD 437 receives the result of an operation performed by SEL 423 and MAU 431 and provides the result to WRS 439 or FPRF 411.

(5) WR 440 transfers FPD from WRS 439 to MAU 431.

(6) MSH 435 carries bits to and from MAU 431 to a point where MSH 435 may be connected to the corresponding MSH 435 of the other module, and thus allows data to be shifted between corresponding MAUs 431.

(7) WSH 441 carries bits to and from WRS 439 to a point where WSH 441 may be connected to the corresponding WSH 441 of the other module, and thus allows data to be shifted between corresponding WRSs 439.

(8) ACRY 429 receives a carry bit from MAU 431 and provides it to SEL 423.

(9) BCRY 431 of Module (1) 401 is connected to ACRY 429 of Module (2) 443, and thus provides a carry bit from MAU 431 of that module to MAU 431 of the first module.

(10) SHCTL 427, finally, provides shift control signals from SEL 423 to WRS 439 in both Module (1) 401 and Module (2) 443.

In addition, the operation of certain components in each module of IFPU 400 is affected by control signals which are labelled SPM/DPM 425 and SP/DP 426 in FIGS. 4 and 4A SPM/DPM 425 indicates whether a module is being used as Module (1) 401 or Module (2) 443. SP/DP 426 indicates whether a single-precision or a double-precision operation is being performed. The value of SPM/DPM 425 for a given module is set when the module is installed. The value of SP/DP 426 is determined by the FPI currently contained in IR 202 of Host Processor 201. If IR 202 contains a single-precision FPI, SP/DP 426 indicates a single-precision operation; if IR 202 contains a double-precision FPI, SP/DP 426 indicates a double-precision operation.

3.2 Combination of Module (1) 401 and Module (2) 443 into IFPU 400

As may be seen from FIG. 4A, Module (2) 443 of IFPU 400 contains exactly the same components and buses as Module (1) 401. The two identical modules of IFPU 400 are made to function as a single FPU by means of three techniques which effectively reconfigure Module (1) 401 and Module (2) 443 as required by their positions in IFPU 400 and the precision of the FPD they are processing. The techniques are the following: first, connections between the buses of each module allow FPD to move between the buses; second the signals SP/DP 426 and SPM/DPM 425 indicate how a module is being used and what kind of operation is being performed; third, certain portions of Module (2) 401 remain unconnected to the remainder of IFPU 400 or Host Processor 201. The discussion deals first with the bus connections.

The bus connections are the following:

(1) (s+e) of FA(2) 415 are connected to (g) of FA(1) 415.

(2) (g) of FA(2) 417 is connected to ground, thereby producing 0 values in (g).

(3) (s+e) of FB(2) 415 are connected to (g) of FB(1) 415.

(4) (g) of FB(2) is also connected to (s+e) of FB(2) in a present embodiment. (g) is set to 0 by MAU(2) 431, as will be explained in detail hereinafter.

(5) (s+e) of FD(2) 437 is connected to (g) of FD(1).

(6) MSH(2) 411 is connected to MSH(1) 411 in such fashion that high-order bits from MAU(2) 431 are shifted into low-order bits of MAU(1) 431 on a left shift and the reverse occurs on a right shift.

(7) WSH(2) 441 is connected to WSH(1) 441 in such fashion that on a left shift, high-order bits from WRS(2) 439 are shifted into low-order bits of WRS(1) 439 and high-order bits from WRS(1) 439 into low-order bits of WRS(2) 439 and the reverse occurs on a right shift.

(8) ACRY(2) 433 is connected to BCRY(1) 434.

(9) BCRY(2) 434 is connected to ground, thereby producing a 0 carry in.

(10) SHCTL(1) is connected to SHCTL(2).

Continuing with the signals, when SPM/DPM received by a module specifies that the module is Module(1) 401, its components respond as follows:

(1) SEL(1) 423 is enabled and outputs a result on FD(1) (s+e).

(2) FPRF(1) 411 does not respond to SP/DP 426.

(3) MAU(1) 431 responds to SP/DP by providing 0's in place of the (g) inputs from FB(1) 417 when SP/DP specifies a single-precision operation.

When SPM/DPM received by a module specifies that the module is Module(2) 443, its components respond as follows:

(1) SEL(2) 423 is disabled and outputs neither a a result (s+e) to FD(2) 437 nor SHCTL(2) 321.

(2) FPRF(2) 411 responds to SP/DP by outputting 0's to FA(2) 415 when SP/DP specifies a single-precision operation and otherwise outputting the contents of the specified register of FPRF(2) 411.

(3) MAU(2) 431 responds to SP/DP by providing 0's to that portion of MAU(2) 431 which otherwise receives its input from FB(2) 417 or WRS(2) 439 when SP/DP specifies a single-precision operation and otherwise receiving inputs from FB(2) 415 or WRS(2) 439.

The third technique is used to prevent signals in FPST 404 from Module(2) from being received by Host Processor 201 or IFPU 400. Lines carrying FPST 404 from Module(2) 443 are simply left unconnected, while Host Processor 201 and Module (2) 443 are connected to the corresponding lines from Module(1) 401, so that Host Processor 201 and Modules (1) and (2) 443 respond only to FPST 404 from Module(1) 401.

3.3 Operation of IFPU 400

The control signals from Host Processor 201 which control the operation of IFPU 400 are responded to simultaneously by components of both Module (1) 401 and Module (2) 443. For example, if a multiplication operation is required for the FPI being executed, MAU(1) 431 and WRS(1) 439 on Module (1) 401 and Mau(2) 431 and WRS(2) 439 on Module (2) 443 will perform exactly the same operations. As will be seen in more detail below, during a single-precision operation, Module (2) 443 is operating only on 0's, and thus its operations do not affect the results of the operations performed simultaneously in Module (1) 401. During a double-precision operation, Module (1) 401 operates on (s+e+m(1)) and in addition, bits of m(2) which it receives from Module (2) 443 via the connections described above between FA(1) 415 and FA(2) 415, FB(1) and FB(2) 417 and returns to Module(2) 443 via FD(1) and FD(2) 437, while Module (2) 443 operates on the remaining bits of m(2) and g(2). Thus, the desired double-precision operation is performed on (s+e+m(1)+m(2)+g), or the entire double-precision FPD. One consequence of this mode of operation is that when IFPU 400 is controlled by microcode, the microcode for single-and double-precision operations is essentially identical. For example, the only distinction between a single-precision multiplication operation and a double-precision one is the number of times the operation of computing a partial product and adding it to the previous partial products must be performed.

3.3.1 Operation of IFPU 400 when Performing Single-Precision Operations

When IFPU 400 is to perform a single-precision operation, the FPD upon which the operation is to be performed is loaded into FPRF(1) 411. While the operation is being performed, SEL(2) 423 is disabled by SPM/DPM 423. SP/DP 426 causes FPRF(2) 411 to output 0's to FA(2), MAU(1) 431 to provide 0's instead of FB(1) (g) 417, and MAU(2) 431 to provide 0's instead of FB(2) (m+g). SEL(1) 423 thus receives (s+e) from registers in FPRF(1) 411 selected by RA(1) 411 via FA(1) 415 and FB(1) 417, while MAU(1) 431 receives (m) from the selected registers in FPRF(1) 411 via FA(1) 415 and FB(1) 417. Because FA(1)(g) 415 is connected to FA(2)(s+e) 415 and FA(2) 415 is receiving 0's from FPRF(2) 411, MAU(1) 431 receives 0's via FA(1)(g) 415. As mentioned above, MAU(1) 431 itself provides 0's in place of the inputs from FB(1) (g) 417. Thus, MAU(1) 431 is performing operations on (m+g), exactly as required for the single-precision operation.

MAU(2) 431, on the other hand, is operating on 0's. Since FA(2) (m) 417 receives 0's from FPRF(2) and FA(2) (g) is grounded, MAU(2) 431's inputs from FA(2) consist solely of 0's, and MAU(2) 431 itself provides 0's in place of the inputs from FB(2) 415 or WRS(2) 439. If the operation stores an intermediate result in WRS(2) 439, that result will be 0. Other methods of providing 0's to MAU(2) 431 are possible. For example, SP/DP 426 might cause MAU(2) 431 to select 0's as inputs instead of FA(2) 415 or FB(2) 415. SEL(2) 423 is receiving inputs from FA(2) (s+e) and FB(2) (s+e), but since it has been disabled, it produces no outputs to FD(2) 437. SHCTL(2) 427 is ignored, since both Module(1) 401 and Module(2) 443 are connected only to SHCTL(1) 427.

In addition and subtraction operations performed by MAU(1) and MAU (2) 431, no data is shifted between MAU(1) 431 and MAU(2) 431. In single precision addition and subtraction, MAU(1) 431 adds or subtracts (m+g) received from FA(1) (m+g) 415 and FB(1) (m+g) 417 or WR(1) 440. MAU(2) 431 adds or subtracts 0's, and consequently, never outputs a carry bit on ACRY(2) 433 to MAU(1). At the end of the operation, (m) result produced by MAU(1) 431 is stored in the register of FPRF(1) 411 specified by RA(1) 413 and (g) and the 0's produced by MAU(2) are stored in the corresponding register of FPRF(2) 411 specified by RA(2) 413.

In single-precision multiplication and division operations, the situation at the beginning of the operation is the same as for addition and subtraction. However, in these operations, data may be shifted between MAU(1) 431 and MAU(2) 431 via MSH(1) and (2) 435. As long as the shift is from MAU(2) 431 to MAU(1) 431 (to the left), MAU(2) 431 merely provides 0's to MAU(1) 431, as generally expected in such a shift operation. A shift to the right may provide non-0 data to MAU(2). Such a shift does not occur in the divide operation. It may occur in the multiplication operation, but is without effect, since MAU(2) 431 receives its multiplicand from FA(2) 415, which, as mentioned, carries only 0's. Any multiplication of the shifted data received from MAU(1) 431 consequently produces only 0 as a result, and no carry bit appears on ACRY(2) 433. Thus, at the end of a multiplication or division operation, as at the end of an addition or subtraction operation, the result SPM 107 is on FD(1) (m) 437, (g) is on FD(2) (s+e), and 0's are on FD(2) (m+g) 437.

In single-precision operations using the shifter of WRS 439, for example, normalization, data may be shifted back and forth between WRS(1) 439 and WRS(2) 439 via WSH(1) and WSH(2) 441. Since SEL(2) 423 on Module (2) 443 has been disabled and SHCTL(1) 427 is connected to SHCTL(2) 427, both WRS(1) and WRS(2) are controlled during such operations by SHCTL(1). As explained above, during single-precision operations, MAU(2) 431 produces only 0 results, and consequently, WRS(2) 439 always contains 0's unless other data is shifted into it from WRS(1) 439. When such a shift occurs, the shifted data does not affect MAU(2) 431, since, as mentioned above, SP/DP 426 causes MAU(2) 431 to provide 0's in the place of inputs from WRS(2) 439. Indeed, on the next operation using WRS(2) 439 as a destination for the results from MAU(2) 431, WRS(2) 439 will again contain only 0's. Thus, when a left shift operation is performed under control of SHCTL(1) 427, WRS(2) 439 receives the most-significant digits shifted out of WRS(1) 439 and provides 0's for the least-significant digits of WRS(1) 439, and when a right shift operation is performed, WRS(2) 439 receives the least-significant digits shifted out of WRS(1) 439 and provides 0's for the most-significant digits.

3.3.2 Operation of IFPU 400 when Performing Double-Precision Arithmetic Operations Before a double-precision operation is performed, each double-precision operand is loaded into a register of FPRF(1) 411 and a corresponding register of FPRF(2) 411. The register of FPRF(1) 411 contains S 103, E 105, and part of DPM 115; the corresponding register of FPRF(2) contains the remainder of DPM 115. During the operation, SP/DP 426 indicates a double-precision operation; consequently, FPRF(2) 411 no longer provides 0's to FA(2) 415 and MAU(2) 431 only provides 0's as guard digits for FB(2) or WR(2) 440 instead of completely replacing inputs from FB(2) 417 or WRS(2) 439 with 0's. SEL(2) 423 remains disabled.

At the beginning of the operation, RA(1) 413 and RA(2) 413 specify one pair of corresponding registers in FPRF(1) 411 and FPRF(2) 411 as the source for FA 415 and another pair as the source for FB 417. FA(1) 415 receives (s+e+m(1)) from FPRF(1) and because of the connection between FA(1)(g) 415 and FA(2)(s+e) 417, the digits of (m(2)) being carried on FA(2)(s+e). FA(2) 415 receives the remaining digits of (m(2)) and (g) from ground. FB(1) 415 likewise receives (s+e+m(1)) from FPRF(1) and the digits of (m(2)) being carried on FB(2)(s+e). MAU(2) 431 provides guard digits in place of FB(2)(g).

In operation, SEL(1) 413 operates on (s+e) from FA(1) 415 and FB(1) 417, MAU(1) 431 and WSR(1) 439 operate on (m(1)) from those buses and the digits of (m(2)) received from FA(2) 415 and FB(2) 417, while MAU(2) 431 and WSR(2) 439 operate on the remainder of (m(2)) and (g) from FA(2) 415 and FB(2) 417. If operations in MAU(2) 431 produce a carry bit, that carry bit is propagated to MAU(1) 431 by means of ACRY(2) 433. Results of the operations on (s+e+m(1)) and the bits of (m(2)) received from FA(2) 415 and FB(2) 417 appear on FD(1) 437. Because of the connection between FD(1)(g) 437 and FD(2)(s+e) 437, the results of the operations on the bits of (m(2)) received from FA(2) 415 and FB(2) 417 also appear on FD(2) 437. Additionally, FD(2) 437 carries the results of the operations on the remaining bits of (m(2)), and thus FD(2) 437 carries all of m(2) and (g). On completion of the operation, (s+e+m(1)) of the result pass via FD(1) 437 to a selected register of FPRF(1) 411, while (m(2)) of the result passes to the corresponding register of FPRF(2) 411.

Because MAU(1) 431 and MAU(2) 431 are connected by MSH 435 and ACRY(2) 433 is connected to BCRY(1) 435, MAU(1) 431 and MAU(2) 431 function as a single double-precision MAU. Any carry out of MAU(2) 431 is propagated to MAU(1) 431 and data shifted to the right out of MAU(1) 431 is shifted into MAU(2) 431 and vice-versa. Similarly, because WRS(1) 439 and WRS(2) 439 are connected by WSH 441 and both respond to SHCTL(1) 427, they function as a single double-precision WRS 439.

4. Details of a Preferred Embodiment of IFPU 400—FIGS. 5–5B

Since the general principles of construction of FPUs are well-known to those skilled in the art, the following discussion restricts itself to a description of an embodiment of those aspects of IFPU 400 which make it possible to construct IFPU 400 out of two identical modules. The discussion first describes a preferred embodiment of a Module 501 of IFPU 400, and then describes how Modules 501 are combined to form a single IFPU 400.

Referring to FIGS. 5 through 5B, as with the previous drawings, components which have the same function as components shown in those drawings have the same names, but have reference numbers specific to FIG. 5. Figures in parentheses following the names specify bits of a bus or bits in a register. For example, FB(0–7) specifies bits 0–7 on the FB bus. Further, components of Module 501 making up functional units of IFPU 400 are enclosed in dashed boxes having the number of the corresponding functional unit of IFPU 400. Finally, when a bus connects components shown on one of FIGS. 5–5B with components shown on another of those figures, a figure number at the point where the bus leaves a figure indicates where its continuation may be found.

Module 501 is implemented in the preferred embodiment on a single printed circuit board. The interconnections between the two Modules 501 making up an IFPU 400 are implemented by connecting the lines carrying the relevant signals to pins on each Module 501 and then establishing the proper interconnections by means of the backplane in which the two Modules 501 are installed and J connectors connecting pins which are not plugged into the backplane. Backplane connections also provide the SPM/DPM signal which specifies whether a given Module 501 is the first or second module of IFPU 400 and the SP/DP signal which specifies whether a single- or double-precision operation is being performed.

The FPD operated on by an IFPU 400 made up of Modules 501 has the format shown in FIG. 1: a single-precision FPD 101 contains a 1-bit S Field 103, a 7-bit E field 105, a 6 hexadecimal digit (24 bit) SPM Field 107, and a 2 hexadecimal digit (8 bit) GD Field 111. A double-precision FPD 113 contains S 103, E 105, and GD 111 fields as above, and additionally contains a 14-digit DPM Field 115.

4.1 Embodiments of FPU State 405, and FPRF 411 in Module 501—FIG. 5

Beginning the description of Module 501 with FIG. 5, FPU State 405 is implemented in Module 501 by means of FPS 15 and IS 513, which have the same function as their counterparts in IFPU 400. FPST 504, which carries status signals to Host Processor 201, is connected to a pin which is plugged in the backplane.

FPRF 411 is implemented in Module 501 by means of I-Mux 505, RF 507, and RFCTL 510. I-Mux 505 selects sources of data for storage in RF 507. I-Mux 505 is connected to RF 507 by means of FDI Bus 506. RF 507 is a 16×32 dual-port register file which may be implemented by means of 8 16×4 dual-port RAMS of type AM 29705A, manufactured by Advanced Micro Devices Inc. RAMS of type AM29705A simutaneously output data from two addressed registers. Data from one of the registers is output at an A port and data from the other is output at a B port. Data is input at a separate input port and stored in the register specified for output to the B port. In response to a low signal, RAMS of type AM29705A output 0's at the A port instead of the contents of the addressed register. In Module 501, the A port of each RAM is connected to FA Bus 509 and the B port to FB bus 511. The input port is connected to FDI 506. The signal which causes 0's to be output is produced by RFCTL 510, whose output is low only when SP/DP 508 indicates a single-precision operation and SPM/DPM indicates that Module 501 is the second Module 501 of IFPU 400.

FPD is received in FPRF 411 from Data Bus 503 and FD Bus 537. As mentioned above, FPD from the A port of RF 507 is output onto FA Bus 509 and FPD from the B port onto FB 511. Data Bus 503 is a 32-bit bus which transfers FPD between Host Processor 201, Module 501, and Memory 217. Single-precision FPD may be transferred to and from IFPU 400 made up of 2 Modules 501 in a single operation; double precision FPD must be transferred in two operations, one loading a register in RF 507 in the first Module 501, and the other loading the corresponding register in RF 507 in the second Module 501. FD Bus 537 is a 40-bit bus, but conductors for only 32 of the bits are connected to RF 507. FD Bus 537 carries the results of FP operations on Module 501 to RF 507 and two GDs 111. The conductors carrying the GDs 111 are not connected to RF 507. IMUX 505 selects either Data Bus 503 or FD 537 as the source of FPD to be stored in RF 507.

FPD from RF 507 is output to Data Bus 503 via FA 509. FA 509 also provides data to and receives data from IS 513. FPS 515 receives inputs from FDI 506, and thus may be loaded from Data Bus 503 via IMUX 505 and outputs data to FA 509, which in turn may provide the data to Data Bus 503. By this means, state from FPS 515 and IS 513 may be saved and restored.

Portions of FA 509, FB 511, and FD 513 are connected to pins which are in turn inserted in the backplane or connected by J-connectors. The interconnections made by the backplane or the J-connectors to these pins are the following:

* FA(0–7) and (32–39) 509 are connected to pins which are inserted in the backpanel. The backpanel leaves the pins for FA(0–7) 509 of the first Module 501 unconnected; it connects the pins for FA(32–39) 509 to conductors from the pins for FA(0–7) 509 from the second Module 501; it connects the pins for FA(32–39) 509 from the second Module 501 to ground.

* Bits 32–39 of FB 511 are connected to pins; a J-connector connects the pins for FB(32–39) 511 on the first Module 501 to the corresponding pins on the second Module 501. Driver 517 provides values to these bits from bits 0–7 of FB 511. Driver 517 is responsive to SPM/DPM Signal 534, and is enabled only when SPM/DPM 534 indicates a second Module 501. Thus, FB(0–7) 511 from the second Module 501 appear as FB(32–39) 511 on the first Module 501.

* FD 537 is arranged in the same fashion as FA 509. FD(32–39) 537 and FD(0–7) 537 are connected to pins which are inserted in the backpanel. The backpanel leaves the pins pins for FD(0–7) 537 from the first Module 501 unconnected; it connects pins for FD(32–39) 537 from the first Module 501 to conductors from pins for FD(0–7) 537 from the second Module 501; it connects pins for FD(32–39) 537 from the pins for the second Modle 501 to ground.

4.2 Embodiment of RA 413 in Module 501—FIG. 5

Continuing with the embodiment of RA 413 in Module 501, RA 413 provides addresses specifying registers in RF 507 from which data is to be output via RF 507's A port to FA 509 and via RF 507's B port to FB 511. The address for the A port is carried by ADA 525, and the address for the B port by ADB 527. Addresses of registers in RF 507 are received via RA1 and RA2 531 from Host Processor 201. RA1 529 and RA2 523 are connected to pins inserted in the backplane. The pins from both Modules 501 receive the same values on RA1 529 and RA2 523. RA 413 contains components which allow either RA1 or RA2 523 to serve as an address for either the A port or the B port. The components are the following:

* AMUXA 521, a multiplexer which is connected to RA1 529, RA2 531, and ADA 525. AMUXA 521 selects an input from either RA1 529 or RA2 531 and provides the selected input to ADA 525.

* AMUXB 523, a multiplexer which is connected to RA1 529, RA2 531, and ADB 527. AMUXB 523 selects an input from either RA1 529 or RA2 531 and provides the selected input to ADB 527.

* SW 519, a register containing a single bit. The register is settable by SWS 518, a signal derived from a signal of FPST 504 in the present embodiment. As previously explained, both Modules 501 receive signals from FPST 504 produced by the first Module 501. The register's output is connected to inputs in AMUXA 521 and AMUXB 523 which cause these muxes to select either RA1 529 or RA2 531 as the input.

As may be seen from the above description of the components, SWS 518 causes RA 413 in Module 501 to swap the addresses received via RA1 529 and RA2 531. The capability of swapping addresses increases the efficiency of floating-point addition and subtraction operations in Module 501. A floating-point addition or subtraction operation may be performed only on FPDs which have the equal values for E 105. If the FPDs do not have equal values for E 105, SPM 107 or DPM 115 of the FPD with the smaller value of E 105 must be shifted to the right and E incremented until E 105 is the same for both FPDs.

In Module 501, when a shifting operation is required before an addition or subtraction can be performed, SEL 423 detects this fact and produces signals which automatically cause MAU 431 to pass the value which must be shifted to WRS 439 for shifting. As may be seen in FIG. 5B, in Module 501, the shift operation is performed in WRS 439 by Hex Shifter (HSH) 591, found in FIG. 5B. As may be seen in that Figure, HSH 591 is connected by HSR bus 593 to FS MUX 559, which also receives inputs from FB 511. If the FPD which was shifted to equalize E 105 was originally output from the B port of RF 507, this arrangement causes no problems: after shifting is complete, the addition or subtraction operation is performed by causing FRMUX 557 to select FA 519 as one input to ASALU 571 and FSMUX 559 to select HSR 593 as the other input to ASALU 571 and causing ASALU 571 to perform the desired operation. However, if the reverse is true and the shifted FPD was originally received from the A port, the input from FA 511 is no longer usable and the shifted FPD from HSH 591 and the FPD output from the B port of RF 507 both appear as inputs to FS Mux 559.

This problem is solved in Module 501 by means of the address swapping mechanism in RA 413. In Module 501, Sign and Exponent Logic (SELOG) 533 (FIG. 5A) sets a bit in IS 513 if it detects a value of E 105 on FA 509 which is less than the value of E on FB 511 during an addition or subtraction operation. That bit generates SWS 518, which in turn sets SW 519, and consequently, the addresses received on RA1 529 and RA2 531 are swapped when the addition or subtraction operation is performed. This being the case, the address which originally specified the FPD to be output to the B port now specifies the FPD to be output to the A port, and the addition or subtraction operation may be performed using that FPD and the shifted FPD from HSH 591. Since both Modules 501 receive the same addresses on RA1 529 and RA2 531, and both Modules 501 respond to IS 513 of the first Module 501, both RFs 507 always receive identical addresses.

4.3 Embodiment of SEL 423 in Module 501—FIG. 5A

SEL 423 includes Sign and Exponent Logic (SELOG) 533, Shift Logic (SHLOG) 534, and Sign and Exponent Driver (SED 535). SELOG 533 receives bits 0–7 from FA 509 and bits 0–7 from FB 511 as inputs. When a register in RF 507 contains S Field 103 and E Field 105 of FPD, bits 0–7 contain those fields. SELOG 553 performs the operations required on the S Fields 103 and E Fields 105 which it receives as inputs and outputs 8 bits of results via SED 535 to FD 537 (0–7).

While performing the operations, SELOG 553 generates signals to which SHLOG 534 responds by generating the proper SHCTL signals on SHCTL 532. SHCTL 532 is connected to a J-connector. SED 535 drives the 8-bit result produced by SELOG 533 from FA 509 (0–7) and FB 511 (0–7) onto FD 537 (0–7). SHLOG 534 and SED 535 are both responsive to SPM/DPM Signal 534, received from the backplane. When SPM/DPM 534 specifies that Module 501 is the second Module 501 of IFPU 400, SED 535 is disabled and logic in SHLOG 534 prevents SHLOG 534 from producing SHCTL 432. SHCTL 432 for WR 585 is received via a J-connector from the first Module 501. Further, FD 537 (0–7) are supplied from the first Module 501 via the backplane.

4.4 Embodiment of MAU 431 in Module 501—FIGS. 5A and 5B

MAU 431 has two main components: a multiplication unit, shown in FIG. 5A, and an addition and subtraction unit, shown in FIG. 5B. Both units perform computations by means of techniques well known in the art, and will be dealt with in detail only as required to explain how a unit on one Module 501 passes data to a corresponding unit on another module 501.

4.4.1 The Multiplication Unit—FIG. 5A

Beginning with the multiplication unit shown in FIG. 5A, its components are the following:

(1) MAND Register 539, which receives the multiplicand from FA 509 (0–39) and outputs it to MNET 545.

(2) MER register 541, which receives the multiplier from FB 511 (0–39) and outputs two adjacent hexadecimal digits (8 bits) at a time of the multiplier to MNET 545.

(3) MERSEL 542, which selects the two hexadecimal digits output by MER 541.

(4) Multiplication Net (MNET) 545, which simultaneously multiplies SPD in MAND Register 539 by the two hexadecimal digits received from MER 541. Multiplication Nets like the MNET 545 are well-known in the art. A detailed description of a similar multiplication net may be found in U.S. Pat. No. 4,208,722.

(5) HI Register 547, which receives the result of the multiplication of the high-order digit of the two hexadecimal digits.

(6) LO Register 549, which receives the right-shifted result of the multiplication of the low-order digit.

(7) MULTALU 553, which adds the contents of HI 547 to the contents of LO 549 to obtain a partial product.

(8) MCTL 556, which controls the operation of MULTALU 553.

The right shift of the contents of LO 549 is accomplished by connecting bits 24–31 of ML Bus 551 to Driver 550, which in turn is connected to bits 0–7 of LO 549. Bits 0–23 of ML 551 are connected to bits 8–31 of LO 549, thereby effecting the right shift of two digits.

Multiplication units of both Modules 501 of IFPU 400 function as a single unit. This is accomplished by cross connections between the units and by means of logic which disables certain elements of the multiplication unit in response to SPM/DPM 534. Beginning with MER 541 and MERSEL 542, MERSEL 542 responds to signals from Host Processor 201 specifying digits contained in MER 541. Logic in MERSEL 542 responsive to SPM/DPM signal 534 causes each Module 501 in IFPU 400 to ignore codes specifying digits contained in MER 541 of the other module. The selected digits are provided to MNET 545 of both Modules 545 by MY 543. MY 543 passes the selected digits to pins on Module 501, and the corresponding pins of each Module 501 in IFPU 400 are connected by a J-connector.

When the first Module 501 shifts the output of MNET 535 on ML 551 to the right, the shifted digits must be passed to LO 549 on the second Module 501. ML 551 is consequently connected to pins on each Module 501 and the corresponding pins of each Module 501 are connected by a J-connector. Further, Driver 550 is controlled by SPM/DPM 534 and is enabled only when SPM/DPM 534 specifies that Module 501 is the first Module 501 of IFPU 400. Thus, shifted digits pass from the first Module 501 to the second Module 501 and are stored in bits 0–8 of the second Module 801's LO 549. The shifted digits are also received in LO 549 of the first Module 501, but MCTL 556 of the first Module 501 responds to SPM/DPM 534 by causing MULTALU 553 in the first Module 501 to simply pass bits 0–8 of HI 547 through instead of adding them to bits 0–8 of LO 547. Carry signals are transferred between MULTALUs 553 in the first Module 501 and the second Module 501 by means of MCI 552 and MCO 554. MCI 552 provides a carry signal to MULTALU 553, and MCO 554 receives a carry signal from MULTALU 553. Both are connected to pins in Module 501 which are connected to the backplane. The backplane leaves the pin which receives MCO 554 from the first Module 501 unconnected; the backplane connects the pin which provides MCI 552 to the first Module 501 to the one which outputs MCO 554 from the second Module 501; the pin which provides MCI 552 to the second Module 501 is grounded. By means of these connections, carry signals propagate from MULTALU 553 in the second Module 501 to MULTALU 553 in the first Module 501.

The multiplication unit operates by multiplying the two least significant digits of the multiplier's mantissa by the multiplicand's mantissa in MNET 545 of both Modules 501, adding the partial products thereby produced in MULTALU 553 to obtain another partial product, and storing that partial product as the intermediate partial product in WR 585. Then the multiplication operation is repeated with the next two digits. The intermediate partial product in WR 585 is shifted to the right by two digits (8 bits) in HSH 591 and is then added in ASALU 571 to the partial product produced by MULTALU 553 in the second multiplication operation. The above procedure is repeated until the multiplicand has been multiplied by all of the digits of the multiplier.

4.4.2 The Addition-Subtraction Unit—FIG. 5B

The Addition-Subtraction Unit of MAU 431 in Module 501 is represented in FIG. 5B. It contains the following components:

(1) FRMUX 557, which receives FPD from either FA (8–39) 509 or MB 555, the output bus for MULTALU 553, and provides it to FR Bus 567.

(2) FSMUX 559, which receives FPD from either FB 511 (8–39) or HSR 593, the output bus of HSH 591, and provides it to FS Bus 565. FSMUX 559 may further output hexadecimal digits containing 0's in response to FSZCTL 560.

(3) FSZCTL 560 responds to signals including SPM/DPM 534 and SP/DP 508 to cause FSMUX 559 to output 0's.

(4) RND 561 contains logic which rounds a FPD as required by the values of the FPD's GD 111.

(5) DG allows GD 111 to be transferred from FS Bus 565 to FR Bus 567.

(6) FS Bus 565 receives FPD from FS Mux 559 and provides it to GD 563, one side of ASALU 571, and WRMUXA 579.

(7) FR Bus 567 receives FPD from DPR 569, RND 561, and GD 563 and provides it to one side of ASALU 571.

(8) ASALU 571 performs addition and subtraction operations on the inputs it receives from FS Bus 565 and FR Bus 567 and outputs the result to FF Bus 573. ASALU 571 receives a carry signal via ACI 572 and provides a carry signal via ACO 570.

(9) FF Bus 573 provides the result to DPR 569 and MOF 575

(10) DPR 569 is used to hold a partial remainder during division operations.

(11) MOF 575 is a multiplexer which drives the result onto FD 537 and if necessary, shifts the result 1 hexadecimal digit to the right.

As with the multiplication unit, logic responsive to SPM/DPM 534 and FP/DP 508 and interconnections between the addition-subtraction unit in one Module 501 and the other Module 501 make the two addition-subtraction units function as a single unit. Beginning with FSZCTL 560, FSZCTL 560 responds to SPM/DPM 534 and SP/DP 508 as follows:

* When SPM/DPM 534 indicates that Module 501 is the first module and SP/DP 508 that a single-precision operation is taking place, FSZCTL 560 causes FSMUX 559 to output 0's on FS (32–39) 565, thereby providing GDs 111 to the FPD received via FB 515 or HSR 593. When SP/DP indicates that a double-precision operation is taking place, FSZCTL 560 allows FSMUX to pass the FPD it receives from FB 515 or HSR 593 unchanged.

* When SPM/DPM 534 indicates that Module 501 is the second module and SP/DP 508 that a single-precision operation is taking place, FSZCTL 560 causes FSMUX 559 to output all 0's on FS 565, regardless of the inputs from FB 515 or HSR 593. When SP/DP 508 indicates that a double-precision operation is taking place, FSZCTL 560 causes FSMUX 559 to output 0's on FS 32–39 565, thereby providing GDs 111 to the double-precision FPD.

SPM/DPM 534 and SP/DP 508 also control RND 561 and GD 563. When SPM/DPM 534 indicates that Module 501 is the first Module 501 and SP/DP 508 that a single-precision operation is taking place, RND 561 and GD 563 on Module 501 are enabled. When SP/DP indicates that a double-precision operation is taking place, RND 561 and GD 563 are disabled. Thus, RND 561 and GD 563 of the first Module 501 are enabled only when that module is performing a single-precision operation.

The provisions for interconnections are the following: ACI 572 and ACO 570 are connected to pins which are inserted in the backplane. Conductors in the backplace connect ACI 572 of the first Module 501 to ACO 570 of the second Module 501. The backplane provides a ground for ACI 572 of the second Module 501. The carry signal may thus propagate from ASALU 571 of the second Module 501 to ASALU 571 of the first Module 501. Bits 8, 40, 4–7, and 36–39 of FF 573 are all connected to pins which are inserted in the backplane. The pin carrying FF (8) 573 of the first Module 501 remains unconnected in the backplane, while the backplane connects FF(40) 573 of the first Module 501 to FF(8) 573 of the second. The pin carrying FF(40) 573 of the second Module 501 remains unconnected. The backplane provides the values 1000 to FF(4–7) of the first Module 501; the backplane connects FF(36–39) of the first Module 501 to FF(4–7) of the second. The pin carrying FF(36–39) 573 of the second Module 501 remains unconnected.

The connection between FF(40) 573 of the first Module 501 and FF(8) 573 of the second is required for the division operation. The division operation creates a sequence of partial remainders. Each partial remainder is shifted one bit to the left before the next phase of the division operation. In Module 501, the left shift is accomplished by connecting FF(9–40) 573 to the input of DPR 569, thereby eliminating the leftmost bit. The new rightmost bit is provided by FF(40) 573. As a result of the interconnections just described, the new rightmost bit on the first Module 501 comes from FF(8) 573 of the second Module 501, while the new rightmost bit on the second Module 501 comes from ground and is therefore 0.

The connection between FF(36–39) 573 of the first Module 501 and FF(4–7) 573 of the second is required for the one-hexadecimal digit right-shift operations performed by MOF 575 in response to certain operations of MAU 431. MOF 575 performs the shift by selecting FF(4–35) 573 as its output instead of FF(8–39) 573. In the first Module 501, FF(4–7) 573 always carries the value 1000 provided by the backplane; in the second Module 501, FF(4–7) 573 carries bits from FF(35–39) 573 of the first Module 501, which are thus not lost.

4.5 Embodiment of WRS 439 in Module 501—FIG. 5B

In Module 501, WRS 439 includes the following components:

(1) WRMUXA 579, which selects an input from FS 565 and FR 567 and outputs the selected input to WRN 583.

(2) WRMUXB 581, which selects an input from WRO 589 and FD 537 and outputs the selected input to WRN 583.

(3) QSEL 590, which selects a source for WRO(39) 589 in response to signals including SPM/DPM 534 and SP/DP 508. As will be explained in more detail below, QSEL 590 is used during the division operation.

(4) WR 595, the working register, which receives inputs from WRN 583 and outputs FPD to either WRX 587 or WRO 589.

(5) WROCTL 580, which causes WR 595 to output to WRX 588 or WRO 589 in response to signals including SPM/DPM 534.

(6) WRX 587, which provides FPD output from WR 595 to HSH 591 on the other Module 501. WRX 587 on each Module 501 outputs to pins which are connected by means of J-connectors.

(7) WRO 589, which provides FPD output from WR 595 to HSH 591 on that Module 501. WRO(8) 589 and WRO(40) 589 are connected to pins which plug into the backpanel.

(8) HSH 591, which performs 16-bit and 1- to 4-bit rotations on FPD received either from WRX 587 or WRO 589. It is controlled by SHCTL 532, received from the backplane.

(9) HSR 593, which returns the result of the shift to FSMUX 559.

WRS 439 of the first Module 501 and the second Module 501 of IFPU 400 function as a single unit because both receive SHCTL 532 from the first Module 501, because of the interconnections provided by WRX 587, and because of control logic in WROCTL 586 responsive to SPM/DPM 534 and SP/DP 508.

Beginning with WROCTL 586 and WR 585, WR 585 in Module 501 may be constructed of quad D registers with one input and two outputs of type AM25S18, produced by Advanced Micro Devices, Inc. One of the outputs of the D-registers is connected to WRO 589; the other is connected to WRX 587; which output is enabled is determined by WROCTL 586. WROCTL 586 responds to SPM/DPM 534 by causing WR 585 on the first Module 501 to output to WRX 587 when a right rotation is being performed and to WRO 589 when a left rotation is being performed and WR 585 on the second module to do the opposite. As a result, WRSs 439 of the two Modules 501 together function as a single rotator. As described above, SHCTL 532 on the second Module 501 is received from the first Module 501, and consequently, the entire rotator is controlled by SHCTL 532 from the first Module 501.

The backplane connections of WRO(8) 589 and WRO(40) 589 leave WRO(8) 589 of the first Module 501 unconnected, connect WRO(40) 589 of the first Module 501 to WRO(8) of the second Module 501, and WRO(40) 589 of the second Module 501 to a pin which provides the QBIT 592 signal from the first Module 501. All of these connections, as well as QSEL 590, are used in the division operation. The floating-point division operation used in Module 501 produces a quotient 1 bit at a time. As each bit of the quotient is produced, it is shifted into WR 585. The shift is performed in Module 501 by WRMUXB 581, which receives WRO(9–39) 589 from WR 585 and outputs them as WRN(8–38) to WR 585, which thus contains the value on WRO shifted one bit to the left. The value of WRO(40) 589 comes either from QBIT 592 produced by the first Module 501 or from the second Module 501 via the backplane connection of WRO(40) 589.

QBIT 592's value is that of the quotient bit produced by the current phase of the division operation. In a single-precision division operation, QSEL 590 on the first Module 501 responds to SPM/DPM 534 and SP/DP 508 by selecting QBIT 592 as the source of WRO(40). Each quotient bit is thus shifted into WR 585 of the first Module 501 and the contents of WR 585 in the second Module 501 are not transrerred to WR 585 in the first Module 501.

In a double-precision division operation, QSEL 590 on both Modules 501 responds to SPM/DPM 534 and SP/DP 508 by selecting the backplane connection as the source of WRO(40) 589. In the second Module 501, WRO(40) is connected on the backplane to QBIT 592 from the first Module 501. Consequently, each quotient bit is shifted into the least-significant bit of WR 585 in the second Module 501. As the division operation continues, the quotient bits are shifted across WR 585 in the second Module 501 and then via the back plane connection between WRO(8) 589 of the second Module 501 and WRO(40) 589 of the first Module 501 into WR 585 in the first Module 581. Thus, at the end of the operation, the two WRs 585 contain the complete double-precision quotient.

5 Operation of two Modules 501 as an IFPU 400

In the discussion of the components of the embodiments of MAU 431 and WRS 439 in Modules 501, it was shown how these components cooperated in two Modules 501 to perform operations together; here, the overall operation of the two Modules 501 making up an IFPU 400 will be discussed.

In all operations performed by an IFPU 400 made up of two Modules 501, SEL 423 of the second Module 501 has no effect on the operation. On the second Module 501, the SPM/DPM 334 signal disables the output of SEL 423, and both the first and second Modules 501 respond only to control signals from SEL 423 of the first Module 501. Further, bits (0-7) of FA 509, FB 511, and FD 537 from the second Module 501 appear as bits (32-39) of FA 509, FB 511, and FD 537 on the first Module 501. This is accomplished in the cases of FA 509 and FD 537 by backplane cross connections, and in the case of FB 511 by means of a J-connector and Driver 517 enabled by SPM/DPM 334 specifying a second Module 501. Finally, RA 413 on both Modules 501 responds to SWS 518 from the first Module 501, so that RF 507 receives the same addresses in both Modules 501.

When a single-precision operation is being performed by IFPU 400, SP/DP 508 causes RF 507 on the second Module 501 to output 0's to FA 509, FSMUX 559 on the first Module 501 to provide 0's in the place of bits 32-39 of FPD received in FSMUX 559 from FB 511 or HSH 591, and FSMUX 559 on the second Module 501 to provide 0's in the place of all bits of FPD received from FB 511 or HSH 591. Consequently, FA(509) on the first Module 501 carries S 103, E 105, and SPM 107 of one Single-precision FPD 101 from RF 507 and GD 111 consisting of 0's received from FA(0-7) 511 of the second Module 101. FB 511 on the first Module 501 carries S 103, E 105, and SPM 107 of another single-precision FPD 101 from RF 507, and when that single-precision FPD 101 is output from FSMUX 559 to ASALU 571, FSMUX 559 provides it with 0's in GD 111. On the second Module 501, FA 509 carries only 0's and FSMUX 559 on the second Module 501 sets FPD it receives from FB 511 to 0 before passing it to ASALU 571. MAU 431 and WRS 439 on the second Module 501 therefore process only 0's and provide 0's as output to FD 537. At the end of the operation, the 0's are returned to RF 507. On the first Module 501, on the other hand, SEL 423 processes FA(0-7) 509 and FB(0-7) 511, carrying S 103 and E 105 of the single-precision FPD 101 being processed, and outputs the result to FD(0-7), while MAU 431 and WRS 439 process FA(8-39) 509 and FB(8-39) 511, carrying SPM 107 of the single-precision FPD 101 being processed and GD 111 provided in the case of FA 509 by the second Module 501 and in the case of the value on FB 511 by FSMUX 559. The result is output to FD(8-39), and FD(8-32) are returned to RF 507.

When a double-precision operation is being performed, S 103, E 105, and 6 digits of DPM 115 of each double-precision FPD 113 being operated on is stored in registers in RF 507 of the first Module 501, and the remaining 8 digits of DPM 115 of the double precision FPDs 113 are stored in corresponding registers in RF 507 of the second Module 501. FSMUX 559 on the first Module 501 responds to SP/DP 508 during the double-precision operation by outputting unchanged all bits which it receives from FB 511 or HSR 593. FSMUX 550 on the second Module 501 responds to SP/DP 508 by outputting 0's in the place of bits 32-39 received from FB 511 or HSR 593.

Thus, during the operation, FA 509 on the first Module 501 carries S 103 and E 105 on FA(0-7) 509, the 6 digits of DPM 115 received from RF 507 on FA(8-31) 509, and two additional digits received from FA(0-7) 509 of the second Module 501 via the backplane connections on FA(32-39). Similarly, FB 511 on the first Module 501 carries S 103 103 and E 105 on FB(0-7) 511, the 6 digits of DPM 115 received from RF 507 on FB(8-31) 511, and two additional digits received from FB(0-7) of the second Module 501 via the J-connector. FA 509 on the second Module 501 carries the two digits of DPM 115 provided to the first Module 501 on FA(0-7) 509 and the remaining 6 digits of DPM 115 on FA(8-32). The grounded pins of FA(32-39) 509 supply GD 111. FB 509 on the second Module 501 similarly carries the two digits of DPM 115 provided to the first Module 501 and the remaining 5 digits of DPM 115. GD 111 is supplied by FSMUX 559.

During operation, SEL 423 of the first Module 501 processes S 103 and E 105 from FA(0-7) 509 and FB(0-7) 509 of the first Module 501. The digits of DPM 115 and GD 111 are processed by MAU 431 and WRS 439 of both Modules 501. MAU 431 and WRS 439 of the first Module 501 processes the left-most 8 digits of DPM 115, while MAU 431 and WRS 439 of the second Module 501 processes the remaining 6 digits and GD 111. As already decribed, connections connecting each of the buses MY 543, ML 551, FF 573, WRX 587, and WRO 589 of one Module 501 to the corresponding bus of the other module allow bits of DPM 115 to pass between Modules 501 as required by the operation. The manner in which SP/DP Signal 508 causes the components of MAU 431 and WRS 439 in each Module 501 of IFPU 400 to cooperate to perform double-precision operations was explained in the discussion of the components of MAU 431 and WRS 439.

When the double-precision floating-point operation is finished, the result Double-precision FPD 113 is placed on FD 537. SEL 423 of the first Module 423 provides S 103 and E 105 of the result Double-precision FPD 113 to FD(0-7) of the first Module 501; MAU 431 of the first Module 501 outputs the leftmost 8 digits of the result DPM 115 to FD(8-39) of the first Module 501; MAU 431 of the second Module 501 outputs the remaining 6 digits of the result DPM 115 and GD 111 to FD(8-39) 537. The two digits of the result DPM 115 on FD(32-39) 537 of the first Module 501 are carried via the cross-connections in the backplane to FD(0-7) 537 of the second Module 501. Thus, when the result is stored, the specified register in RF 507 in the first Module 501 receives S 105 and E 103 on FD(0-7) 537 and the leftmost 6 digits of DPM 115 on FD(8-32). The corresponding register in RF 507 in the second Module 501 receives the remaining 8 digits of DPM 115 on FD(0-31) 537. The digits on FD(0-7) 537 come from the first Module 501 via the cross-connection on the backplane, and the digits on FD(8-31) come from MAU 431 of the second Module 501. GD 111 is discarded.

6 Other Configurations of IFPU 400

The foregoing discussion of Module 501 of a preferred embodiment of IFPU 400 has shown how an improved floating-point unit capable of performing single- and double-precision floating point operations may be constructed of two identical modules. Operation of the two modules as a single IFPU 400 is achieved by providing cross-connections between certain buses of the modules so that FPD can move from one module to the other and by providing logic responsive to signals specifying whether a module is being used as the first or second module of an IFPU 400 and whether a single- or double-precision floating-point operation is being performed by IFPU 400. The techniques disclosed herein further allow construction of IFPUs 400 consisting of any number of modules and capable of processing FPD having varying precisions and of IFPUs capable of simultaneously performing operations on several pairs of FPD.

For example, an IFPU made up of four suitably-modified Modules 501 could process single-, double-, triple-, or quadruple-precision FPD. The modifications might include the following:

* SPM/DPM 534 would specify that a Module 501 was either the first, second, third, or fourth Module 501.
* SP/DP 508 would specify that an operation was a single-, double-, triple-, or quadruple-precision operation.
* An additional WRX Bus 587 would be provided, resulting in a WRXA Bus and a WRXB Bus. WRXA would connect WR 585 in a a Module 501 to WR 585 the preceding Module 501 in IFPU 400, and WRXB would connect WR 585 to WR 585 in the following Module 501.
* RFCTL 510, MERSEL 542, FZCTL 560, WROCTL 586, and QSEL 590 would be modified to respond properly to modified SPM/DPM and SP/DP.

The required modifications in RFCTL 510, MERSEL 542, FZCTL 560, WROCTL 586, and QSEL 590 are obvious to those skilled in the art in the light of the disclosures made in the present application. Modified RFCTL 510 and FSZCTL 560 would cause Modules 501 which were not needed in an operation of a given precision to process 0's, as the second Module 501 currently does during single-precision operations; modified QSEL 590 would provide QBIT 592 to the last Module 501 required to process FPD of a particular precision; modified WROCTL 586 would output to either WRXA or WRXB as required by the shift direction; and modified MERSEL 542, finally, would select pairs of hexadecimal digits as required for the FPD being multiplied.

An IFPU 400 could be made to function as a set of parallel FPUs by providing means for disconnecting some or all interconnections between the Modules 501 and enabling some or all SELs 423 in response to a signal indicating that processing was to be done in parallel. Driver 517 connecting and disconnecting FB(32–39) 511 to FB(0–7) 511 and SED 535 enabling and disabling outputs from SEL 423 to FD 537 are examples of such disconnecting and enabling means. Others are well-known to those skilled in the art. An IFPU like that just described consisting of Modules 501 modified to include such disconnecting and disabling means would be able to perform four single-precision or two double-precision operations in parallel.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A floating-point unit for performing calculations on items of floating-point data, each one of said items consisting of bits specifying a sign, an exponent, and a mantissa having one of a plurality of precisions, said floating-point unit comprising:
(1) a plurality of identical modules for processing said floating-point data, each one of said identical modules including
  (a) sign and exponent processing means for performing operation on said signs and said exponents of said items,
  (b) mantissa processing means for performing operations on said mantissas of said items, and
  (c) reconfiguration means within each said module for reconfiguring that module responsive to position specifier signals specifying the position of that module in said floating-point unit and to precision specifier signals specifying said precision of said items currently being processed by said floating-point unit, said reconfiguration means including
    (i) means for enabling said sign and exponent processing means only on a first module of said plurality of modules and
    (ii) means for inhibiting all said mantissa processing means not required to process said mantissas;
(2) backpanel means comprising sockets for receiving each of said identical modules and for providing input output connections to said identical modules, the backpanel means including
  (a) means for providing said position specifier signals and said precision specifier signals to each one of said modules; and
  (b) interconnection means for interconnecting said modules so that certain bits of said mantissas and certain signals for controlling said modules are passed among said modules.

2. In the floating-point unit of claim 1, and wherein: said means for inhibiting said mantissa processing means provides only 0's as inputs to said mantissa processing means.

3. In the floating-point unit of claim 1, and wherein: said interconnection means of said backpanel means includes
  (a) means for providing first certain said bits processed by said sign and exponent processing means of said first module of said plurality of modules to said mantissa processing means of a module other than said first module of said plurality of modules and
  (b) means for returning said first certain bits from said mantissa processing means to said first module.

4. In the floating-point unit of claim 1, and wherein: said interconnection means further include mantissa processing means interconnection means for passing first certain ones of said certain bits and second certain ones of said certain signals among said mantissa processing means in said modules, whereby said mantissa processing means function as a single mantissa processing unit.

5. In the floating-point unit of claim 1, and wherein: the values of said position specifier signals for each said module are set upon installation of said module in said floating-point unit and remain unchanged thereafter.

6. In the floating-point unit of claim 1, and wherein: each said module is a printed circuit board and said interconnection means include certain pins on said printed circuit board inserted in said backpanel means and conductors in said backpanel means.

7. In the floating-point unit of claim 1, and wherein: said plurality of precisions includes only a first said precision and a second said precision greater than said first precision;
said plurality of modules includes only said first module and a second said module;
said position specifier signals specify whether each said module of said two modules is said first module or said second module;
said precision specifier signals specify whether said items have said first precision or said second precision;

each mantissa of said mantissas of said items having said second precision includes
- (a) a first portion having as many said bits as said mantissas of said items having said first precision,
- (b) a second portion containing said bits processed by said sign and exponent processing means when said sign and exponent processing means is not disabled, and
- (c) a third portion having the remaining said bits in said mantissa;

when said precision specifier signals specify said first precision, said mantissa is processed by said mantissa processing means on said first module;

when said precision specifier signals specify said second precision, first and second portions of said mantissas are processed by said mantissa processing means on said first module and third portions of said mantissas are processed by said mantissa processing means on said second module:

said means for inhibiting said mantissa processing means inhibits said mantissa processing means in response to said position specifier signals specifying that said module is said second module and said precision specifier signals specifying that said items have said first precision; and said interconnecting means of said backpanel means includes
- (a) means for passing said second portion of said mantissas having said second precision from said second module to said mantissa processing means of said first module and
- (b) means for returning said second portion from said mantissa processing means of said first module to said second module.

8. In the floating-point unit of claim 7, and wherein:
said mantissa processing means of each said module includes
- (a) first bus means,
- (b) working register means connected to said first bus means for receiving said mantissas and outputting bits of said mantissas onto said first bus means, and
- (c) shifter means connected to said first bus means for shifting said bits of said mantissas received from said first bus means;

said interconnecting means includes means for connecting said first bus means of said first module to said first bus means of said second module; and said reconfiguration means further includes means responsive to said position specifier signals specifying said first module for causing said working register means in said first module to provide said bits of said mantissas to said first bus means when said shifter means is shifting said bits of mantissas to the right and means responsive to said position specifier signals specifying said second module for causing said working register means in said second module to provide said bits of said mantissas to said first bus means when said shifter means is shifting said bits of said mantissas to the left.

9. In the floating-point unit of claim 7, and wherein:
said second portions of said mantissas having said second precision include first certain said bits processed by said sign and exponent processing means when said sign and exponent processing means is not disabled.

10. In the floating-point unit of claim 7, and wherein:
said mantissa processing means includes means for receiving guard bits and said mantissa processing unit processes said guard bits together with said mantissa;

said means for passing said second portion of said mantissa from said second module to said mantissa processing means of said first module is connected to said means for receiving guard bits in said first module and provides said second portion to said means for receiving guard bits;

said means for returning said second portion of said mantissa from said mantissa processing means of said first module to said second module returns said guard bits to said second module; and said reconfiguration means includes means for inhibiting said first module from receiving said second portion when said precision signal specifies said first precision.

11. In the floating-point unit of claim 10, and wherein:
said mantissa processing means processes 24 mantissa bits and 8 guard bits;

said sign bit includes 1 bit and said exponent bits 7 bits;

said mantissas having said first precision include 24 mantissa bits;

said mantissas having said second precision include 56 mantissa bits;

said first portion of said second mantissas includes the most significant 24 bits;

said third portion of said second mantissas includes the least-significant 24 bits; and said second portion includes 8 bits processed by said sign and exponent processing means when said sign and exponent Processing means is enabled.

12. In the floating-point unit of claim 7, and wherein:
said mantissa processing means includes means for receiving guard bits and said mantissa processing unit processes said guard bits together with said mantissa;

said means for inhibiting said mantissa processing means includes
- (a) means responsive to said position specifier signals specifying said first module and to said precision specifier signals specifying said first precision for providing 0's as said guard bits to said guard bit receiving means in said mantissa processing means of said first module,
- (b) means responsive to said position specifier signals specifying said second module and to said precision specifier signals specifying said first precision for providing only 0's as inputs in said mantissa processing means, and
- (c) means responsive to said position specifier signals specifying said second module and to said precision specifier signals specifying said second precision for providing 0's as said guard digits, whereby said second module processes only 0's when said items have said first precision.

13. In the floating-point unit of claim 7, and wherein:
said sign and exponent processing means produces shift control signals;

said mantissa processing means includes shifter means responsive to said shift control signals; and said interconnection means provides said shift control signals from said first module to said shifter means in said first module and to said shifter means in said second module, whereby said shifter means in said first module and said shifter means in said second module both respond to said shift control signals from said sign and exponent processing means in said first module.

14. In the floating-point unit of claim 7, and wherein:
said interconnection means includes mantissa processing means interconnection means for passing certain ones of said certain bits and certain ones of said certain signals between said mantissa processing means; and said reconfiguration means includes means for connecting and disconnecting certain ones of said modules from said mantissa processing means interconnection means.

15. In the floating point unit of claim 7, and wherein:
said mantissa processing means includes rounding logic for rounding said mantissas and said reconfiguration means includes means for enabling said rounding logic only when said position specifier signals specify said first module and said precision specifer signals specify said first precision or when said position specifier signals specify said second module and said precision specifier signals specify said second precision.

16. In the floating-point unit of claim 7, and wherein:
said identical modules further include means for outputting status from said identical modules; and said interconnections means of said backpanel means provide said status signals only from said first module.

17. In the floating-point unit of claim 7, and wherein:
the values of said position specifer signals received by each said module are determined by the certain one of said sockets into which said module is installed in said floating-point unit and remain unchanged thereafter.

18. In the floating-point unit of claim 7, and wherein:
each said module is a printed-circuit board; and
said interconnection means of said backpanel means include (a) pins in said printed-circuit board for receiving said certain bits and said certain signals, (b) conductors in a backplane connecting first certain ones of said pins inserted in said backplane in said first module with second certain ones of said pins inserted in said backplane in said second module, and (c) j-connectors connecting third certain ones of said pins in said first module with corresponding said pins in said second module.

19. In the floating-point unit of claim 1, and wherein:
said plurality of precisions includes only a first said precision and a second said precision greater than said first precision;

said plurality of modules includes only said first module and a second said module;

said position specifier signals specify whether each said module of said two modules is said first module or said second module;

said precision specifier signals specify whether said items have said first precision or said second precision;

said mantissa processing means of said two modules are responsive to said precision specifier signals and said position specifier signals so that said mantissas of said items having said first precision are processed by said mantissa processing means on said first module;

each mantissa of said mantissas of said items having said second precision includes (a) a first portion having as many bits as said mantissas of said items having said first precision, (b) a second portion containing said bits processed by said sign and exponent processing means when said sign and exponent processing means is not disabled, and (c) a third portion having the remaining said bits in said mantissa;

when said precision specifier signals specify said first precision, said mantissa is processed by said mantissa processing means on said first module;

when said precision specifier signals specify said second precision, said first and second portions of said mantissas are processed by said mantissa processing means on said first module and said third portions of said mantissas are processed by said mantissa processing means on said second module;

said mantissa processing means further include means for receiving guard bits and said mantissa processing means process said guard bits with said mantissas;

said means for inhibiting said mantissa processing means includes (a) means responsive to said position specifier signals specifying said first module and to said precision specifier signals specifying said first precision for providing guard bits consisting of 0's to said guard bit receiving means, (b) means responsive to said position specifier signals specifying said second module and to said precision specifier signals specifying said first precision for providing only 0's as inputs in said mantissa processing means of said second module, and (c) means responsive to said position specifier signals specifying said second module and to said precision specifier signals specifying said second precision for providing said guard bits consisting of 0's; and said interconnecting means includes (a) means for passing said second portion of said mantissas having said second precision from said second module to said mantissa processing means of said first module and (b) means for returning said second portion from said mantissa processing means of said first module to said second module.

20. In the floating-point unit of claim 19, and wherein:
said module further includes (a) register means for receiving and outputting said items, (b) input bus means connected to said register means, said sign and exponent processing means, and said mantissa processing means for transferring said items from said register means to said sign and exponent processing means and said mantissa processing means, (c) output bus means connected to said sign and exponent processing means, said mantissa processing means, and said register means for transferring said item resulting from said calculations performed by said sign and exponent processing means and said mantissa processing means to said register means;

said interconnection means for passing said second portion of said mantissas to said first module connects a first certain portion of said input bus means on said first module to a second certain portion of said input bus means on said second module;

said interconnection means for returning said second portion of said mantissas to said second module connects a third certain portion of said output bus means on said first module to a fourth certain portion of said output bus means on said second module;

said register means on said first module contains said items having said first precision when said floating-point unit is processing said items having said first precision; and said register means on said first module contains said sign, said exponent, and said first portion of said items having said second precision and said register means on said second module contains said second portion and said second portion of said items having said second precision when said floating point unit is processing said items having said second precision.

21. In the floating-point unit of claim 19, and wherein:

said mantissa processing means processes 24 mantissa bits and 8 guard bits;

said sign bit includes 1 bit and said exponent bits 7 bits;

said mantissas having said first precision include 24 mantissa bits;

said mantissas having said second precision include 56 mantissa bits;

said first portion of said second mantissas includes the most significant 24 bits;

said third portion of said second mantissas includes the least-significant 24 bits; and said second portion includes 8 bits processed by said sign and exponent processing means when said sign and exponent processing means is enabled.

22. A floating-point unit for performing either serial or parallel calculations on items of floating-point data, each one of said items consisting of bits specifying a sign, an exponent, and a mantissa having one of a plurality of precisions, said floating-point unit comprising:

(1) a plurality of identical modules;

(2) external signal providing means for providing external signals to each one of said modules, said external signals including (a) position specifier signals specifying the position of said module in said floating point unit, (b) precision specifier signals specifying said precision of said items currently being processed by said floating-point unit, and (c) parallel-serial signals for specifying whether said floating point unit is performing said calculations serially or in parallel; and (3) interconnection means for interconnecting said modules so that certain bits of said mantissas and certain internal signals for controlling said modules are passed among said modules;

and wherein each one of said identical modules includes (a) sign and exponent processing means for performing operations on said signs and said exponents of said items, (b) mantissa processing means for performing operations on said mantissas of said items, and (c) reconfiguration means for reconfiguring said module responsive to said position specifier signals, said precision specifier signals, and said parallel-serial signals, said reconfiguration means including (i) sign and exponent processor disabling means for disabling said sign and exponent processors on said modules not processing said sign and said exponent, (ii) means for inhibiting said mantissa processing means from affecting said calculations when said mantissa processing means is not required to process said mantissas, and (iii) means for disabling certain ones of said interconnection means when said floating point unit is performing calculations in parallel.

23. In the floating-point unit of claim 22, and wherein: said means for inhibiting said mantissa processing means provides only 0's as inputs to said mantissa processing means.

24. In the floating-point unit of claim 22, and wherein: said interconnection means includes (a) means for providing certain said bits processed by said sign and exponent processing means when said sign and exponent processing means is enabled to said mantissa processing means in a preceding one of said plurality of said modules when said sign and exponent means is disabled in a certain one of said plurality of said modules and (b) means for returning said certain bits from said mantissa processing means in said preceding module to said one module.

25. In the floating-point unit of claim 22, and wherein:

said interconnection means further include mantissa processing means interconnection means for passing first certain ones of said certain bits and second certain ones of said certain signals among said mantissa processing means in said modules, whereby said mantissa processing means function as a single mantissa processing unit when said mantissa processing means interconnection means connecting said mantissa processing means are enabled.

26. In the floating-point unit of claim 22, and wherein: the values of said position specifier signals for each said module are set upon installation of said module in said floating-point unit and remain unchanged thereafter.

27. In the floating-point unit of claim 22, and wherein: said module is a printed circuit board and said interconnection means include certain pins on said printed circuit board inserted in a backplane and conductors in said backplane.

28. In computation means in a digital computer system, the computation means including:

(1) register file means including (a) a plurality of registers, (b) first address input means for receiving a first register address specifying a first register of said plurality of registers, (c) second address input means for receiving a second register address specifying a second register of said plurality of registers, (d) first data output means for outputting first data stored in said first register, and (e) second data output means for outputting second data stored in said second register, said register file being capable of simultaneously receiving said first register address and said second register address and simultaneously outputting said first data and said second data, and (2) ALU means having a first input connected to said first output and a second input connected to said second output, input swapping means for alternatively providing contents of a third register of said plurality of registers to said first input and contents of a fourth register of said plurality of registers to said second input or the contents of said fourth register to said first input and the contents of said third register to said second input comprising:

address swapping means connected to said first address input and to said second address input for receiving a third address and a fourth address and alternatively providing said third address to said first address input and said fourth address to said second address input and said third address to said second address input and said fourth address to said first address input.

29. In the computation means of claim 28, and wherein:

said address swapping means of said input swapping means provides said third address to said second address input and said fourth address to said first address input in response to a swap signal and otherwise provides said third address to said first address input and said fourth address to said second address input; and said input swapping means further includes means for providing said swap signal.

30. In the computation means of claim 29, and wherein:

said address swapping means of said input swapping means includes
  (a) first address multiplexer means responsive to said swap signal and having an output connected to said first address input for receiving said third address and said fourth address, ouputting said fourth address in response to said swap signal, and otherwise outputting said third address and
  (b) second address multiplexer means responsive to said swap signal and having an output connected to said second address input for receiving said third address and said fourth address, outputting said third address in response to said swap signal, and otherwise outputting said fourth address.

31. In a floating-point unit including
(1) register file means including
  (a) a plurality of registers for storing floating-point data including a sign, an exponent, and a mantissa,
  (b) first address input means for receiving a first register address specifying a first register of said plurality of registers,
  (c) second address input means for receiving a second register address specifying a second register of said plurality of registers,
  (d) first data output means for outputting first data stored in said first register, and
  (e) second data output means for outputting second data stored in said second register,
  said register file being capable of simultaneously receiving said first register address and said second register address and simultaneously outputting said first data and said second data,
(2) first bus means connected to said first data output means,
(3) second bus means connected to said second data output means,
(4) sign and exponent processing means connected to said first bus means and said second bus means for receiving said sign and said exponent from said first bus means and from said second bus means,
(5) mantissa processing means connected to said first bus means and said second bus means for receiving said mantissa from said first bus means and from said second bus means including
  (a) a mantissa ALU for performing arithmetic and logical operations on said mantissas, said mantissa ALU having a first ALU input connected to said first bus means, a second ALU input, and an ALU output,
  (b) shifting means for shifting said mantissas, said shifting means having an input connected to said ALU output and a shifting means output, and
  (c) second mantissa input selector means having inputs connected to said second bus means and to said shifting means output and an output connected to said second ALU input,
input swapping means for providing a shifted first mantissa produced by said shifting means from said mantissa of said first data and said mantissa of said second data as inputs to said mantissa ALU comprising:
  (1) address swapping means responsive to a swap signal connected to said first address input and to said second address input for receiving a third address and a fourth address and providing said third address to a said second address input and said fourth address to said first address input in response to said swap signal and otherwise providing said third address to said first address input and said fourth address to said second address input; and
  (2) swap signal providing means in said sign and exponent processing means for detecting when said mantissa of said first data has been shifted and thereupon providing said swap signal.

32. In the floating-point unit of claim 31, and wherein: said address swapping means of said input swapping means includes
  (a) swap register means having an input and an output for receiving said swap signal on said input, storing said swap signal, and outputting said swap signal to said output,
  (b) first address multiplexer means connected to said output of said swap register and having an output connected to said first address input, said multiplexer means serving to receive said first address and said second address, to output said second address in response to said swap signal, and otherwise to output said first address and
  (c) second address multiplexer means connected to said output of said swap register and having an output connected to said second address input, said second address multiplexer means serving to receive said first address and said second address, to output said first address in response to said swap signal, and otherwise to output said second address.

* * * * *